(12) United States Patent
Sunabe et al.

(10) Patent No.: US 11,607,789 B2
(45) Date of Patent: Mar. 21, 2023

(54) TECHNIQUE FOR DETECTING TWISTED MOTION OF ELECTRIC WORKING MACHINE

(71) Applicant: MAKITA CORPORATION, Anjo (JP)

(72) Inventors: Hikaru Sunabe, Anjo (JP); Hirokatsu Yamamoto, Anjo (JP); Takaaki Osada, Anjo (JP)

(73) Assignee: MAKITA CORPORATION, Anjo (JP)

( * ) Notice: Subject to any disclaimer, the term of this patent is extended or adjusted under 35 U.S.C. 154(b) by 142 days.

(21) Appl. No.: 17/018,079

(22) Filed: Sep. 11, 2020

(65) Prior Publication Data

US 2021/0078153 A1 Mar. 18, 2021

(30) Foreign Application Priority Data

Sep. 12, 2019 (JP) .............................. JP2019-166207

(51) Int. Cl.
*B25F 5/00* (2006.01)
*B25F 5/02* (2006.01)
*H02P 29/00* (2016.01)
*B25B 21/00* (2006.01)
*B25D 16/00* (2006.01)

(52) U.S. Cl.
CPC ................ *B25F 5/001* (2013.01); *B25F 5/02* (2013.01); *H02P 29/0027* (2013.01); *B25B 21/00* (2013.01); *B25D 16/006* (2013.01); *B25D 2216/0084* (2013.01)

(58) Field of Classification Search
CPC . B25F 5/001; B25F 5/02; B25B 21/00; H02P 29/0027; B25D 16/006; B25D 2216/0084
See application file for complete search history.

(56) References Cited

U.S. PATENT DOCUMENTS

| 5,584,619 A | 12/1996 | Guzzella | |
|---|---|---|---|
| 10,953,532 B2 * | 3/2021 | Sunabe | ................... B25D 17/24 |
| 10,981,267 B2 * | 4/2021 | Abbott | ................... B25D 16/00 |

FOREIGN PATENT DOCUMENTS

JP 3638977 B2 4/2005

* cited by examiner

*Primary Examiner* — Daniel Jeremy Leeds
(74) *Attorney, Agent, or Firm* — Oliff PLC

(57) ABSTRACT

An electric working machine in one aspect of the present disclosure includes an output shaft, a motor, a housing, an acceleration detector, a twisted motion detector, a reference level changer, and a motor controller. The acceleration detector detects an acceleration of the housing in a circumferential direction of the output shaft. The twisted motion detector detects a twisted motion of the housing based on a reference level and the acceleration detected. The reference level determines that the housing is twisted. The reference level changer changes the reference level based on a rotating motion of the output shaft.

27 Claims, 22 Drawing Sheets

TECHNIQUE FOR DETECTING TWISTED MOTION OF ELECTRIC WORKING MACHINE

CROSS-REFERENCE TO RELATED APPLICATIONS

This application claims the benefit of Japanese Patent Application No. 2019-166207 filed Sep. 12, 2019 in the Japan Patent Office, the entire disclosure of which is incorporated herein by reference.

BACKGROUND

The present disclosure relates to an electric working machine.

Japanese Patent No. 3638977 discloses an electric working machine configured to stop a motor in response to a detection, by an acceleration sensor, of the electric working machine being twisted in a circumferential direction of an output shaft. The acceleration sensor detects an acceleration in the circumferential direction imposed on a main body of the electric working machine and outputs a detection signal. Based on this detection signal, the electric working machine calculates its estimated rotation angle. The electric working machine determines that the electric working machine is twisted when the estimated rotation angle exceeds a permissible angle.

SUMMARY

The aforementioned acceleration varies in accordance with a rotational speed of the output shaft. The rotational speed may vary in accordance with a gear ratio of a transmission disposed between the motor and the output shaft and/or in accordance with a control of the motor by a controller. Variations in the rotational speed may lead to an inaccurate detection of a twisted motion of the electric working machine.

The rotational speed may also vary in accordance with a load imposed on the output shaft by a workpiece. Thus, such a load imposition may lead to an inaccurate detection of the twisted motion of the electric working machine.

Desirably, one aspect of the present disclosure can reduce inaccurate detections of the twisted motion of the electric working machine caused by a change in the rotating motion of the output shaft.

An electric working machine in one aspect of the present disclosure includes an output shaft, a motor, a housing, an acceleration detector, a twisted motion detector, a reference level changer (or a reference level adjuster), and/or a motor controller. The output shaft is configured to be attached to (or hold or fasten) a tool bit (or an attachment). The motor generates a drive force to rotate the output shaft in a circumferential direction of the output shaft. The housing houses the output shaft and the motor. The housing is configured to be gripped (or held) by a user of the electric working machine. The acceleration detector detects an acceleration imposed on the housing (or the electric working machine) in the circumferential direction. The twisted motion detector detects a twisted motion of the housing (or the electric working machine) based on a reference level and the acceleration detected by the acceleration detector. The reference level determines (or indicates) that the housing (or the electric working machine) is twisted. The reference level changer changes (or adjusts) the reference level based on a rotating motion of the output shaft. The motor controller receives a drive command. The motor controller controls the motor in accordance with the drive command. Furthermore, the motor controller stops or restrains drive of the motor in response to the twisted motion detector detecting the twisted motion.

In the electric working machine configured as above, the reference level is changed based on the rotating motion of the output shaft. As a result, it can be reduced to inaccurately detect the twisted motion of the electric working machine even when the rotating motion of the output shaft changes.

The electric working machine may include a manual operation receiver (or a man-machine interface or a human-machine interface) configured to receive a manual operation from the user. The manual operation receiver defines the rotating motion of the output shaft based on the manual operation received by the manual operation receiver.

The reference level changer changes the reference level in accordance with the manual operation received by the manual operation receiver.

In the electric working machine configured as above, the reference level can be changed in accordance with the manual operation received by the manual operation receiver. Consequently, the twisted motion can be accurately detected even if the rotating motion of the output shaft is changed by the manual operation.

Thus, this electric working machine can accurately detect that the electric working machine is twisted (in other words, that the twisted motion is generated) without being influenced by changes in the rotating motion of the output shaft when the output shaft is locked due to the tool bit biting a workpiece, for example. This electric working machine can also ensure safety of the user by stopping or restraining the drive of the motor.

The electric working machine may include a transmission (or gear box) housed in the housing. The transmission may include a first gear ratio and a second gear ratio. The transmission may be configured to be switched to the first gear ratio or the second gear ratio. The transmission may also be configured to transmit the drive force to the output shaft while changing a rotational speed of the motor via the first gear ratio or the second gear ratio. The first gear ratio may be higher than the second gear ratio.

The manual operation receiver may include a gear ratio selector configured to select either the first gear ratio or the second gear ratio in accordance with the manual operation received by the manual operation receiver.

The reference level changer may change the reference level in response to the first gear ratio or the second gear ratio being selected by the gear ratio selector.

Such an electric working machine can accurately detect the twisted motion without being influenced by changes in a rotational speed of the output shaft due to changes in the gear ratio in the transmission.

The manual operation receiver may include a drive command transmitter configured to transmit the drive command in accordance with the manual operation received by the manual operation receiver. The drive command may vary in accordance with details of the manual operation.

The reference level changer may change the reference level in accordance with the drive command transmitted from the drive command transmitter.

In the electric working machine configured as above, the motor rotates in accordance with the details of the manual operation. In other words, the rotational speed of the output shaft changes in accordance with the details of the manual operation. Thus, the twisted motion can be accurately detected owing to changes in the reference level based on the drive command without being influenced by changes in the manual operation.

The manual operation may be any kind of manual operations made by the user. It may be, for example, a displacing operation (for example, a pulling operation) of a switch.

The manual operation receiver may include an upper limit speed setter configured to set an upper limit rotational speed in accordance with the manual operation received by the manual operation receiver.

The motor controller may limit the rotational speed of the motor or the rotational speed of the output shaft to the upper limit rotational speed set by the upper limit speed setter or less.

The reference level changer may change the reference level in accordance with the upper limit rotational speed that is set by the upper limit speed setter.

The manual operation receiver may include an upper limit torque setter configured to set an upper limit of an output torque generated by the output shaft in accordance with the manual operation received by the manual operation receiver.

The motor controller may stop the drive of the motor in response to the output torque reaching the upper limit that is set by the upper limit torque setter. In other words, the motor controller may cause a so-called electronic clutch to function.

The motor controller may limit the rotational speed of the motor or the rotational speed of the output shaft to any rotational speed corresponding to the upper limit that is set by the upper limit torque setter or less.

The reference level changer may change the reference level in accordance with the upper limit that is set by the upper limit torque setter.

The acceleration detector may transmit a detection signal that indicates the acceleration detected by the acceleration detector.

The twisted motion detector may include an electronic filter (or a signal processing filter) having a cutoff frequency. The electronic filter may be configured to extract a detection value from the detection signal. The detection value may indicate the acceleration detected. The cutoff frequency may be higher than a low frequency band and changeable (or variable or adjustable).

The twisted motion detector may detect the twisted motion based on the reference level and the detection value.

The reference level changer may change the cutoff frequency as the reference level.

The reference level changer may lower the cutoff frequency in accordance with a decrease in the rotational speed of the output shaft.

A frequency corresponding to the twisted motion included in the detection signal decreases while the output shaft rotates at a low speed compared with while the output shaft rotates at a high speed.

By changing the cutoff frequency as mentioned above, detection of the twisted motion is facilitated while the output shaft rotates at the low speed, and therefore, it can be reduced to fail detection of the twisted motion while the output shaft rotates at the low speed. Furthermore, it can also be reduced to make an erroneous detection of the twisted motion while the output shaft rotates at the high speed.

The twisted motion detector may perform a signal processing on the detection signal to thereby obtain a feature value of the acceleration. The twisted motion detector may detect the twisted motion in response to the feature value exceeding a threshold. The feature value may be an estimated rotation angle.

The reference level changer may change the threshold as the reference level.

The reference level changer may lower the threshold in response to the rotational speed of the output shaft decreasing in accordance with the manual operation received by the manual operation receiver.

A level of the detection signal decreases while the output shaft rotates at a low speed compared with while the output shaft rotates at a high speed, and thus it may be difficult to detect the twisted motion while the output shaft rotates at the low speed.

The output torque increases when the rotational speed of the output shaft decreases due to changes in the gear ratio of the transmission with the rotational speed of the motor unchanged. Consequently, the electric working machine may be easily twisted.

If the rotational speed of the output shaft decreases not due to changes in the gear ratio of the transmission but due to a decrease in the rotational speed of the motor, then the output torque decreases. In this case, the user may incautiously think that the electric working machine is not going to be twisted and loosen his grip on the electric working machine. If the output shaft is unexpectedly locked in such a situation due to the tool bit biting the workpiece, for example, then the electric working machine may be twisted.

Thus, if the threshold is lowered in response to a decrease in the rotational speed of the output shaft in accordance with the manual operation, the twisted motion can be accurately detected without being influenced by the decrease in the rotational speed of the output shaft. This enables the drive of the motor to be stopped or restrained when the electric working machine is twisted and thus ensures safety.

The reference level changer may be configured such that the reference level is manually set by the user in association with details of the manual operation.

A perceptibility of the twisted motion by the user may depend on a grip force of the user on the electric working machine. The manual setting of the reference level allows the perceptibility of the twisted motion to be adjusted in association with the details of the manual operation according to the user's preferences, and therefore improves the usability of the electric working machine.

The electric working machine may include a load detector configured to detect a magnitude of a load imposed on the output shaft.

The reference level changer may change the reference level in accordance with the magnitude of the load detected by the load detector.

In the electric working machine configured as mentioned above, the twisted motion can be accurately detected without being influenced by the magnitude of the load.

The load detector may detect a physical quantity (or a physical characteristic) that varies in accordance with the magnitude of the load.

The physical quantity may indicate the rotational speed of the output shaft, the rotational speed of the motor, a magnitude of a counter electromotive force generated in the motor, a magnitude of an electric current supplied to the motor, or a magnitude of an electric power supplied to the motor.

The reference level changer may lower the cutoff frequency in accordance with an increase in the load detected by the load detector.

In accordance with an increase in the load, the rotational speed of the output shaft decreases and a frequency of the twisted motion also decreases. Thus, the twisted motion can be accurately detected without being influenced by the magnitude of the load by changing the cutoff frequency based on the magnitude of the load.

The reference level changer may lower the threshold in accordance with an increase in the magnitude of the load detected by the load detector.

The feature value decreases as the load increases. Since the threshold decreases as the load increases, the twisted motion can be accurately detected both when the load is large and when the load is small.

The reference level changer may be configured such that the reference level is manually set by the user in association with the physical quantity.

If the reference level can be manually set by the user in association with the physical quantity, in other words, the magnitude of the load, then the perceptibility of the twisted motion can be adjusted according to the user's preferences. This consequently improves the usability of the electric working machine.

The manual operation receiver may include a rotation direction setter configured to set a rotation direction of the motor to either a first direction or a second direction in accordance with the manual operation received by the manual operation receiver.

The motor controller may control the motor such that the motor rotates in the rotation direction that is set by the rotation direction setter. The reference level changer may change the reference level in accordance with the rotation direction that is set by the rotation direction setter.

The magnitude of the load imposed on the output shaft may vary depending on the rotation direction of the motor. The grip force of the user may vary depending on the rotation direction of the motor.

If the reference level is changed in accordance with the rotation direction of the motor, the twisted motion can be accurately detected without being influenced by the rotation direction of the motor. This can consequently improve the usability of the electric working machine.

The motor controller may control the motor to rotate in the first direction at a first speed in response to the rotation direction being set in the first direction by the rotation direction setter. The motor controller may control the motor to rotate in the second direction at a second speed in response to the rotation direction being set in the second direction by the rotation direction setter. The first speed may be higher than the second speed.

The reference level changer may change the cutoff frequency to a first frequency in response to the rotation direction being set in the first direction by the rotation direction setter. The reference level changer may change the cutoff frequency to a second frequency in response to the rotation direction being set in the second direction by the rotation direction setter. The second frequency may be lower than the first frequency.

The frequency of the twisted motion is lower while the motor rotates in the second direction compared with while the motor rotates in the first direction. Thus, the twisted motion can be detected without being influenced by the rotation direction of the motor by lowering the cutoff frequency while the motor rotates in the second direction.

The reference level changer may change the threshold to a first value in response to the rotation direction being set in the first direction by the rotation direction setter. The reference level changer may change the threshold to a second value in response to the rotation direction being set in the second direction by the rotation direction setter. The second value may be less than the first value.

If the electric working machine is, for example, an electric power tool for tightening a screw, then a tightened screw can be loosened by reversely rotating the motor. The output torque may be large at a moment of loosening the tightened screw.

A detection of the twisted motion is facilitated by lowering the threshold when the motor is rotated in the second direction as mentioned above.

The reference level changer may be configured such that the reference level is manually set by the user in association with the first direction and the second direction.

In such an electric working machine, the perceptibility of the twisted motion can be adjusted in association with the rotation direction of the motor according to the user's preferences. This can improve the usability of the electric working machine.

Another aspect of the present disclosure includes a method of detecting a twisted motion of an electric working machine, the method including:

detecting an acceleration of a housing of the electric working machine in a circumferential direction of an output shaft of the electric working machine, the output shaft being configured to be driven by a motor of the electric working machine, and the housing accommodating the output shaft and the motor therein;

detecting a twisted motion of the housing based on a reference level and the acceleration detected, the reference level determining (or indicating) that the housing is twisted; and changing (or adjusting) the reference level based on a rotating motion of the output shaft.

Such a method can reduce inaccurate detections of the twisted motion of the electric working machine due to a change in the rotating motion of the output shaft.

BRIEF DESCRIPTION OF THE DRAWINGS

Example embodiments of the present disclosure will be described hereinafter with reference to the accompanying drawings, in which:

FIG. 1A is a side view of the electric working machine, and FIG. 1B is a rear side view of the electric working machine;

DETAILED DESCRIPTION OF EXEMPLARY EMBODIMENTS

In the descriptions hereinafter, a rotational speed of a motor (more specifically, number of rotations of a motor per unit time) is also referred to as a rotational frequency. A switch is also simply abbreviated as SW.

First Embodiment

Figure 1B:
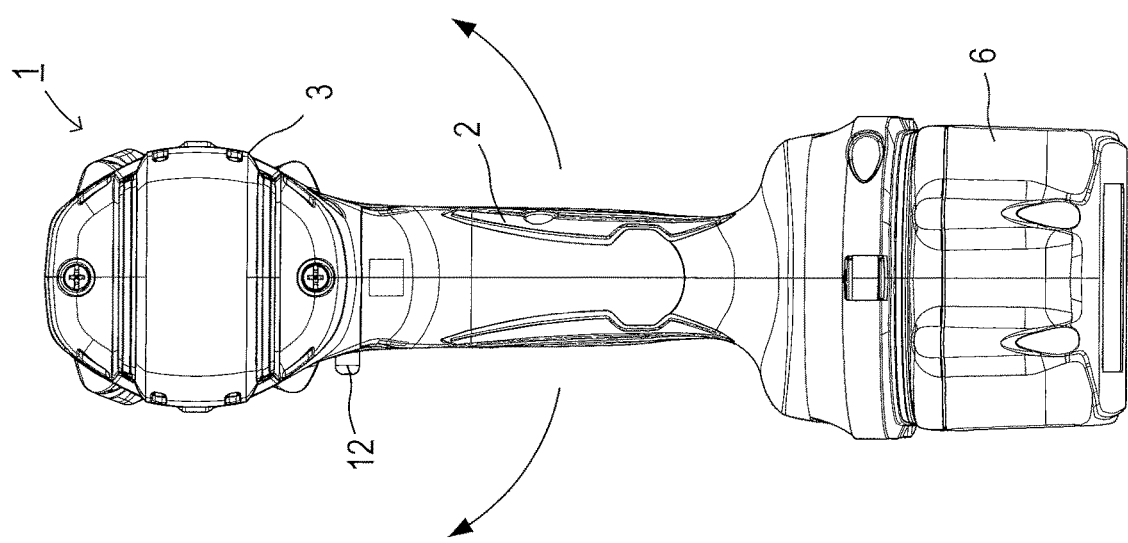
FIGS. 1A and 1B show external appearances of an electric working machine in a first embodiment.
Figure 1A:
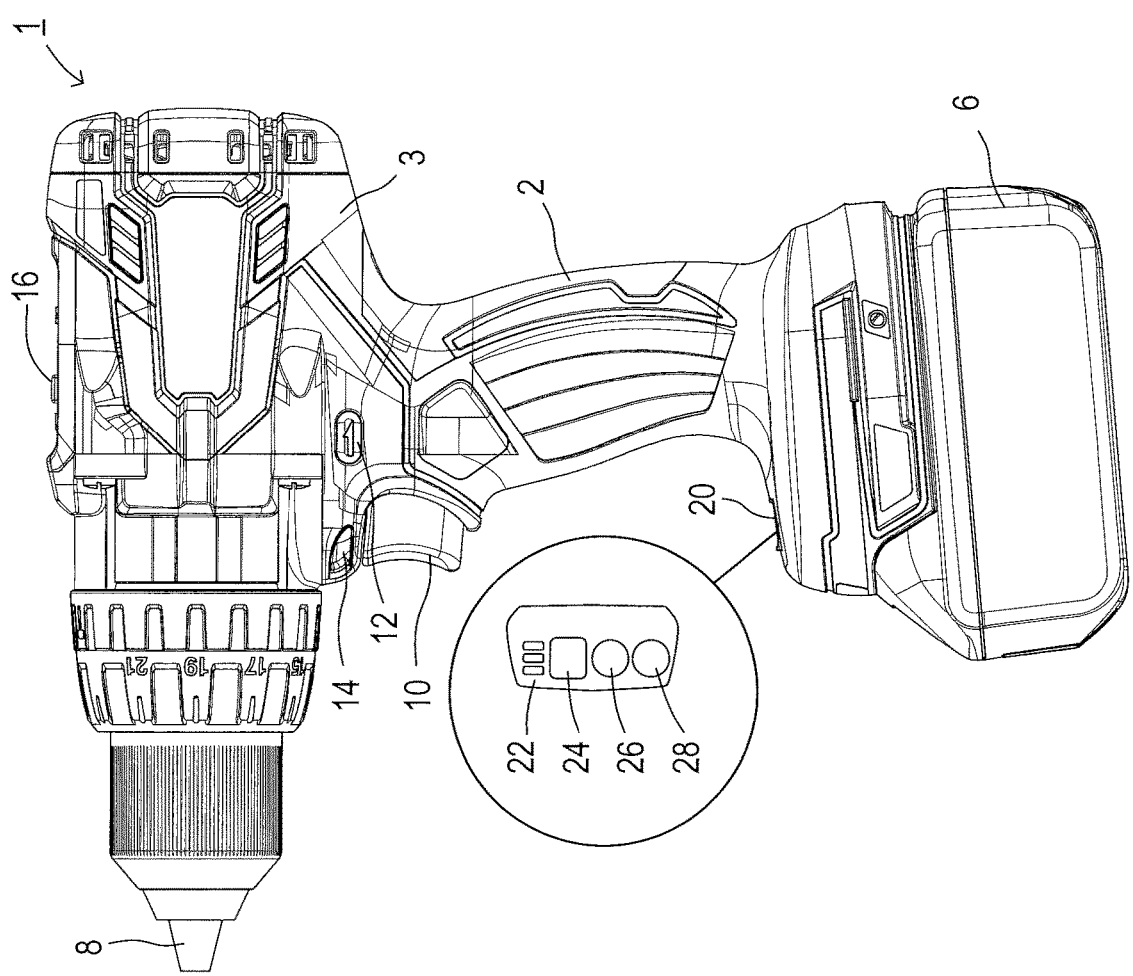

As shown in FIGS. 1A and 1B, an electric working machine 1 in the first embodiment is a driver drill (or drill driver). The electric working machine 1 includes a housing 3. A grip 2 is arranged and extended beneath a lower side of the housing 3. The grip 2 includes a lower end that is detachably attached to a battery pack 6.

The battery pack 6 houses a rechargeable battery (or rechargeable batteries), for example, a lithium-ion battery. The battery pack 6 is attached to the lower end of the grip 2 and electrically connected to a driving device 40 (see FIG. 2) inside the housing 3.

An output shaft 8 protrudes from a leading end of the housing 3 (on the left side of FIG. 1A). The output shaft 8 is configured to hold or fasten various attachments, more specifically, tool bits (not shown), such as a drill bit and a driver bit, at the leading end of the output shaft 8. The housing 3 houses a motor 30 (see FIG. 2) and a transmission (or gear box) 34 (see FIG. 2).

The transmission 34 is configured to transmit (or deliver) rotations or torques (or driving force) of the motor 30 to the output shaft 8 to rotate the output shaft 8. The transmission 34 is configured to reduce a rotational speed of the motor 30 and transmit the rotations of the motor 30 to the output shaft 8.

More specifically, the transmission 34 has a low-speed gear ratio and a high-speed gear ratio and is configured to selectively set a gear ratio of the transmission 34 to either the low-speed gear ratio or the high-speed gear ratio. The low-speed gear ratio causes the output shaft 8 to rotate at a low speed. The high-speed gear ratio causes the output shaft 8 to rotate at a high speed.

On an upper part of the housing 3, a gear ratio select SW 16 is located. The gear ratio select SW 16 serves a user of the electric working machine 1 to manually select either the low-speed gear ratio or the high-speed gear ratio of the transmission 34. The gear ratio select SW 16 corresponds to one example of the gear ratio selector of the present disclosure. Details of the transmission 34 and the gear ratio select SW 16 are omitted here as they are disclosed in, for example, Japanese Unexamined Patent Application Publication No. 2017-205834.

The grip 2 is configured to be gripped (or held) by the user with one hand. A trigger SW 10 is located on an upper side of the grip 2. The trigger SW 10 corresponds to one example of the drive command transmitter of the present disclosure.

The trigger SW 10 is placed in ON-state by being pulled by the user. A resistance value of the trigger SW 10 varies in accordance with the amount that the switch is pulled (or squeezed) by the user (in other words, operated levels). The trigger SW 10 is configured to output a signal corresponding to the operated levels.

A rotation direction select SW 12 is located above the trigger SW 10. The rotation direction select SW 12 serves the user to select a rotation direction of the motor 30 to be either a normal rotation direction (for example, the clockwise direction in FIG. 1B) or a reverse rotation direction (for example, the counterclockwise direction in FIG. 1B). The rotation direction select SW 12 outputs a rotation direction select signal that indicates the selected rotation direction.

An illuminator 14 is located above the trigger SW 10 and near a front end of the housing 3. The illuminator 14 emits light ahead of the electric working machine 1 in response to the trigger SW 10 being pulled. The illuminator 14 may include any light sources, for example, an LED.

An operation panel 20 is located on a front upper part of a base portion of the grip 2 (an attachment portion of the grip 2 where the battery pack 6 is attached). The operation panel 20 includes a remaining energy display 22.

The remaining energy display 22 shows (or indicates) remaining energy of the battery pack 6 (i.e., amount of electric power stored in the battery in the battery pack 6). The remaining energy display 22 in the first embodiment includes three LEDs, which are turned on or off individually in accordance with the remaining energy.

The operation panel 20 includes an indicator 24. The indicator 24 displays an operation mode of the electric working machine 1. The indicator 24 in the first embodiment includes a liquid-crystal display panel.

The operation panel 20 includes a first operation button 26, and a second operation button 28. The first operation button 26 and the second operation button 28 are disposed for user's manual selection of the operation mode or various setting values in a normal order or a reverse order.

The grip 2 houses the driving device 40 (see FIG. 2) that drives the motor 30 with the electric power supplied from the battery pack 6.

Figure 2:
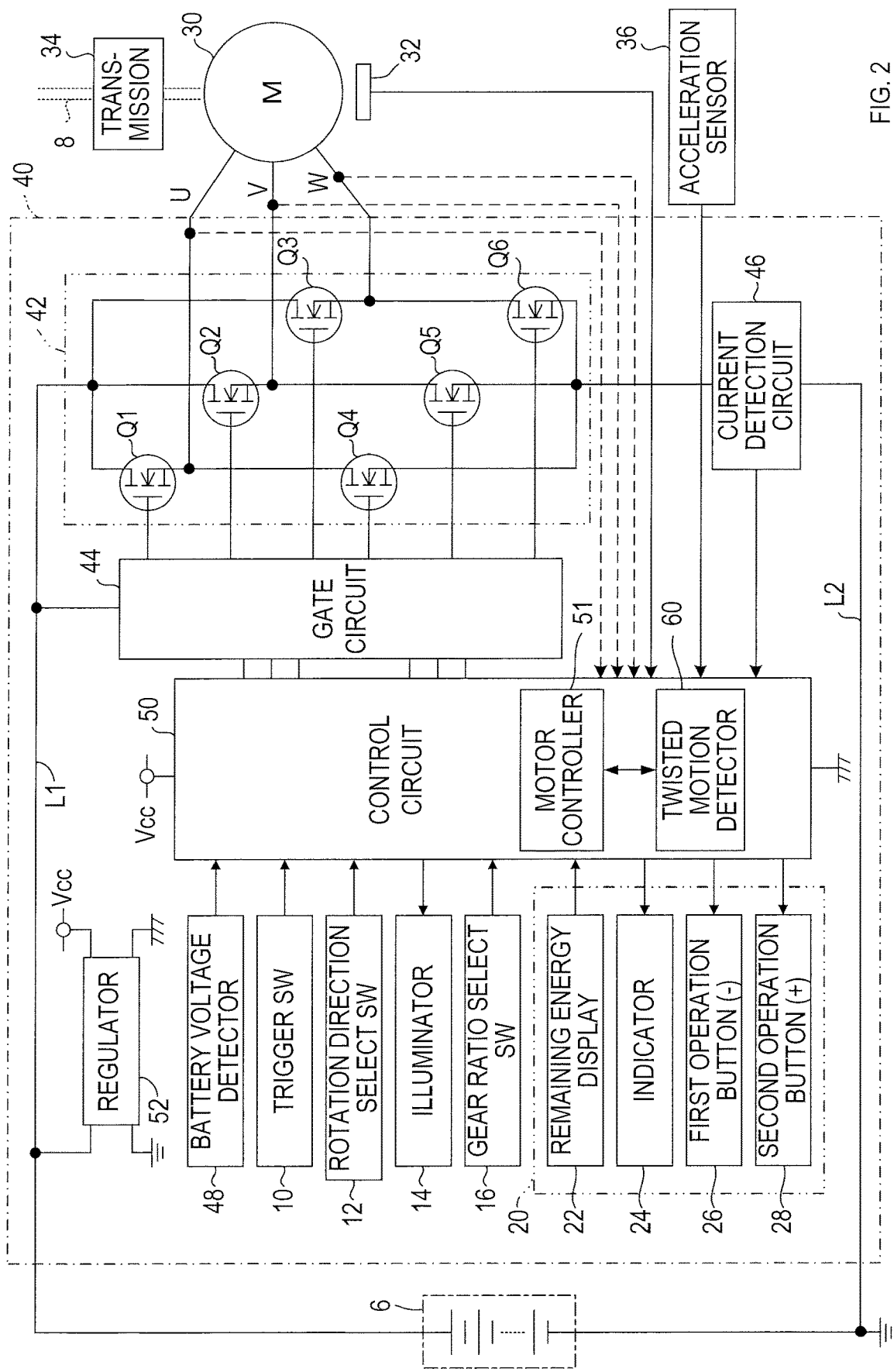
FIG. 2 is a block diagram showing a circuit configuration of a driving system of the electric working machine.

As shown in FIG. 2, the motor 30 in the first embodiment is a three-phase brushless motor. The motor 30 therefore includes not-shown respective armature windings (in other words, U-phase winding, V-phase winding, and W-phase winding) for U-phase, V-phase, and W-phase of the motor 30. The motor 30 includes a rotation sensor 32 to detect a rotational position (or rotational angle) of the motor 30.

The rotation sensor 32 is configured to generate a rotation detection signal at every given rotation angle (more specifically, electrical angle) of the motor 30. The rotation sensor 32 includes a Hall IC having, for example, three Hall elements. The respective Hall elements are arranged for the U-phase, the V-phase, and the W-phase.

The driving device 40 includes a drive circuit 42, a gate circuit 44, a control circuit 50, and a regulator 52.

The drive circuit 42 is configured to receive an electric power from the battery pack 6 and then supply the electric current (hereinafter referred to as motor current) to the U-phase winding, the V-phase winding, and the W-phase winding. In the first embodiment, the drive circuit 42 includes a three-phase full-bridge circuit. The three-phase full-bridge circuit includes first to sixth switching devices Q1 to Q6. In the first embodiment, the first to sixth switching devices Q1 to Q6 are, but not limited to, metal-oxide semiconductor field-effect transistors (MOSFETs).

The first to third switching devices Q1 to Q3 are respectively coupled, at their sources, to terminals U, V, and W of the motor 30. The first to third switching devices Q1 to Q3 are coupled, at their drains, to a positive electrode line L1. The positive electrode line L1 is coupled to a positive electrode of the battery pack 6. In other words, the first to third switching devices Q1 to Q3 function as so-called high-side switches.

The fourth to sixth switching devices Q4 to Q6 are respectively coupled, at their drains, to the terminals U, V, and W. The fourth to sixth switching devices Q4 to Q6 are coupled, at their sources, to a ground line L2. The ground line L2 is coupled to a negative electrode of the battery pack 6. In other words, the fourth to sixth switching devices Q4 to Q6 function as so-called low-side switches.

The gate circuit 44 turns on or off the first to sixth switching devices Q1 to Q6 individually in accordance with control signals transmitted from the control circuit 50. With the first to sixth switching devices Q1 to Q6 being turned on and off individually, the respective motor current supplied to the U-phase winding, V-phase winding, and W-phase winding is controlled and causes the motor 30 to rotate or stop. The control signals include pulse-width modulation (PWM) signals.

The control circuit 50 includes a not-shown microcomputer. The microcomputer includes a CPU, a ROM, and a RAM. The control circuit 50 is coupled to the trigger SW 10, the rotation direction select SW 12, the illuminator 14, the gear ratio select SW 16, and the operation panel 20. A part of or all of the functions executed by the CPU may be achieved by a hardware, including discrete electronic devices and/or at least one integrated circuit (IC), in place of or in addition to the CPU. The control circuit 50 may include two or more microcomputers.

The regulator 52 generates a power source voltage Vcc based on the electric power supplied from the battery pack 6. The power source voltage Vcc has a constant value (for example, 5V DC). The control circuit 50 operates with the power source voltage Vcc supplied from the regulator 52.

The ground line L2 includes a current detection circuit 46. The current detection circuit 46 detects a magnitude of the motor current flowing through the motor 30. The current detection circuit 46 transmits an electric current detection signal having a voltage corresponding to the detected magnitude of the motor current. The driving device 40 includes a battery voltage detector 48. The battery voltage detector 48 detects a magnitude of a voltage supplied from the battery pack 6 (hereinafter referred to as a battery voltage). The voltage detector 48 transmits a voltage detection signal having a voltage corresponding to the detected magnitude of the battery voltage.

The control circuit 50 receives the rotation detection signal from the rotation sensor 32, the electric current detection signal from the current detection circuit 46, and the voltage detection signal from the battery voltage detector 48.

Once the trigger SW 10 is pulled, the control circuit 50 obtains the rotational position and the rotational frequency of the motor 30 based on the rotation detection signal from the rotation sensor 32 and drives the motor 30 in a given rotation direction in accordance with the rotation direction select signal from the rotation direction select SW 12.

More specifically, the control circuit 50 sets a target rotational frequency of the motor 30 in accordance with the operated level of the trigger SW 10 and controls the drive of the motor 30. In other words, the control circuit 50 obtains respective duty ratios of the first to sixth switching devices Q1 to Q6 based on the set target rotational frequency and transmits the control signals (i.e., PWM signals) having the respective duty ratios to the gate circuit 44. Such a control of the motor 30 is not a constant rotation control (so-called feedback control) but an open loop control; nevertheless, the control of the motor 30 of the present disclosure is not limited to the open loop control.

As shown in FIG. 2 with three dashed-line arrows, the control circuit 50 may be coupled to the U-phase winding, the V-phase winding, and the W-phase winding, and may be configured to detect a magnitude of the counter electromotive force generated in each of the U-phase winding, the V-phase winding, and the W-phase winding.

The control circuit 50 executes other controls in addition to the control of the motor 30; the other controls include lighting of the illuminator 14, and lighting of the remaining energy display 22 in accordance with the remaining energy in the battery pack 6.

The control circuit 50 functions as a motor controller 51 that controls the drive of the motor 30 and also functions as a twisted motion detector 60.

The twisted motion detector 60 functions to detect that the housing 3, and thus the electric working machine 1, is twisted in a circumferential direction of the output shaft 8 shown with arrows in FIG. 1B and stop the drive of the motor 30. Such a twisted motion of the electric working machine 1 may occur when the output shaft 8 is locked in an operation to tighten a screw due to the screw biting a workpiece or in an operation to open a hole due to a drill bit biting a workpiece.

To achieve these functions of the twisted motion detector 60, the housing 3 includes an acceleration sensor 36. The acceleration sensor 36 detects a magnitude of a rotational acceleration imposed on the housing 3 in the circumferential direction of the output shaft 8. The acceleration sensor 36 outputs an acceleration detection signal having a voltage corresponding to the detected magnitude of the rotational acceleration. The acceleration sensor 36 corresponds to one example of the acceleration detector in the present disclosure.

Figure 3:
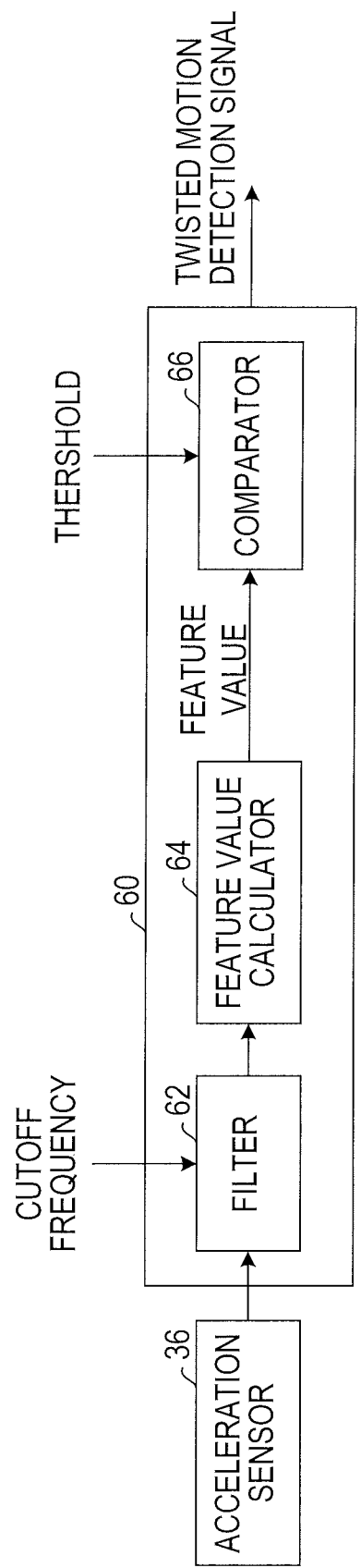
FIG. 3 is a block diagram showing a function configuration of a twisted motion detector of the electric working machine.

As shown in FIG. 3, the twisted motion detector 60 includes a filter 62, a feature value calculator 64, and a comparator 66.

The filter 62 generates a filtered signal based on the acceleration detection signal transmitted from the acceleration sensor 36. More specifically, the filter 62 extracts a signal component having a twisted motion frequency from the acceleration detection signal, removes an unwanted component including a gravity acceleration component from the extracted signal component and generates the filtered signal. The twisted motion frequency corresponds to a frequency of the twisted motion of the housing 8 in the circumferential direction. the filter 62 includes a bandpass filter.

The feature value calculator 64 performs a signal processing (or arithmetic, for example, integration) on the filtered signal based on a given detection algorithm and calculates a feature value corresponding to a twisted angle of the housing 3.

The comparator 66 compares the feature value calculated in the feature value calculator 64 with a first threshold or a second threshold. If the feature value exceeds the first threshold or the second threshold, then the comparator 66 determines that the housing 3 is twisted and transmits a twisted motion detection signal to the motor controller 51. Once receiving the twisted motion detection signal, the motor controller 51 stops the motor 30.

In the first embodiment, a cutoff frequency for the bandpass filter included in the filter 62 is changed in accordance with the gear ratio selected in the transmission 34 (i.e., the low-speed gear ratio or the high-speed gear ratio). Alternatively, in the first embodiment, the first threshold or the second threshold is set in accordance with the selected gear ratio.

In the first embodiment, the filter 62 may include a high-pass filter in addition to or in place of the bandpass filter to remove a low-frequency signal component, including at least gravity acceleration, as an unwanted signal component.

In the first embodiment, the twisted motion detector 60 includes the feature value calculator 64. Nevertheless, the filtered signal may be directly supplied to the comparator 66 as the feature value without being supplied to the feature value calculator 64.

Next, a first twisted motion detecting process is explained. The first twisted motion detecting process is executed in the control circuit 50 so that the control circuit 50 serves the function of the twisted motion detector 60.

The first twisted motion detecting process is executed when the control circuit 50 is serving the function of the motor controller 51 and driving the motor 30, in other words, when the user is processing the workpiece with the electric working machine 1.

Figure 4A:
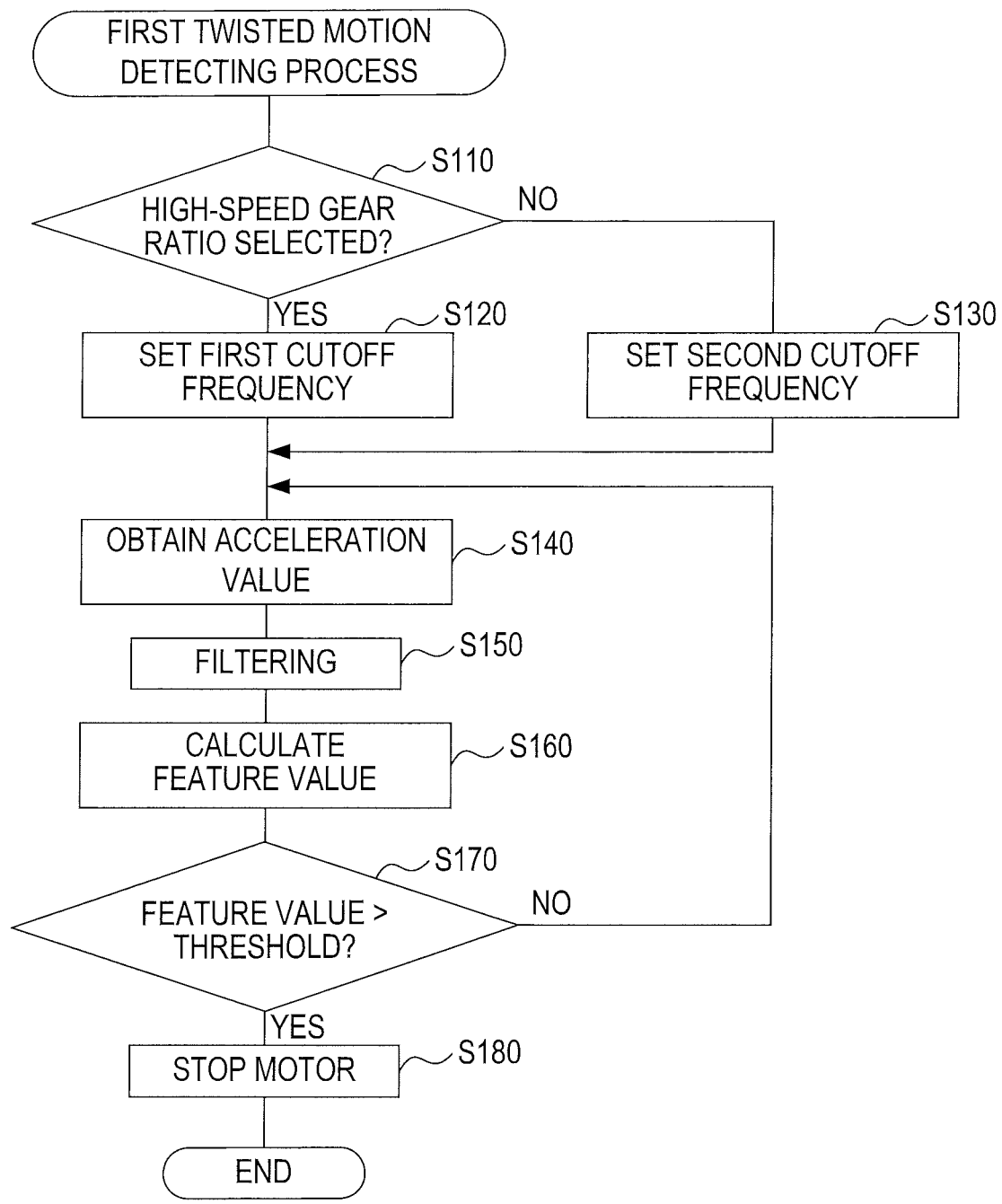
FIG. 4A shows a flow chart of a first twisted motion detecting process.

In the first twisted motion detecting process as shown in FIG. 4A, the control circuit 50 first reads a position of the gear ratio select SW 16, that is the selected gear ratio, and determines whether the selected gear ratio is the high-speed gear ratio in S110.

If the selected gear ratio is the high-speed gear ratio (S110:YES), then the output shaft 8 rotates at a high speed. The control circuit 50 thus proceeds to S120 and sets a first cutoff frequency for the filter 62 and then proceeds to S140. The first cutoff frequency corresponds to the high-speed gear ratio.

If the selected gear ratio is the low-speed gear ratio (S110:NO), then the output shaft 8 rotates in a low speed. The control circuit 50 thus proceeds to S130 and sets a second cutoff frequency for the filter 62 and then proceeds to S140. The second cutoff frequency corresponds to the low-speed gear ratio. In other words, the second cutoff frequency is lower than the first cutoff frequency.

In S140, the control circuit 50 retrieves the acceleration detection signal from the acceleration sensor 36 and obtains an acceleration value by analog-to-digital (A/D) converting the acceleration detection signal.

In S150, the control circuit 50 serves as the filter 62 and executes a filtering process on the acceleration value obtained in S140. In other words, the control circuit 50 performs a filtering on the acceleration value with the first cutoff frequency set in S120 or with the second cutoff frequency set in S130.

In the subsequent S160, the control circuit 50 executes a process as the feature value calculator 64. More specifically, the control circuit 50 calculates a feature value corresponding to the twisted angle of the housing 3 by processing the filtered acceleration value with a twisted motion detection algorithm.

The control circuit 50 executes a process as the comparator 66 in S170. More specifically, the control circuit 50 compares the feature value calculated in S160 with a threshold and determines whether the feature value exceeds the threshold. This threshold is preset for a detection of the twisted motion.

If the control circuit 50 determines that the feature value is equal to or less than the threshold (S170: NO), then the control circuit 50 returns to S140 and executes the processes from S140 to S170 again.

If the control circuit 50 determines that the feature value exceeds the threshold (S170: YES), then the control circuit 50 determines that the housing 3 is being twisted to a large extent (in other words, the twisted motion is occurring) and proceeds to S180. In S180, the control circuit 50 commands the motor controller 51 to stop the motor 30 and ends the first twisted motion detecting process.

As mentioned above, in the first twisted motion detecting process, the first cutoff frequency or the second cutoff frequency is set for the filter 62 in accordance with the selected gear ratio for the transmission 34.

Figure 5:
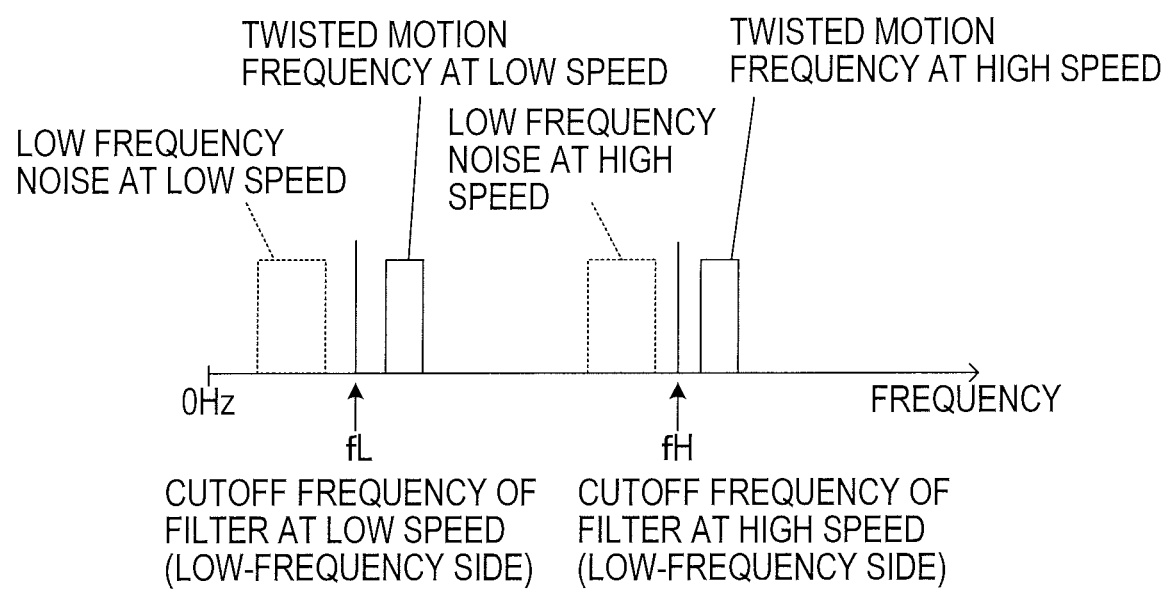
FIG. 5 is an explanatory diagram of an operation to change a cutoff frequency in accordance with a rotational speed of an output shaft.

In a case where the low-speed gear ratio is selected, the rotational frequency of the output shaft 8 is low compared to a case where the high-speed gear ratio is selected. Thus, as shown in FIG. 5, the twisted motion frequency in a case where the output shaft 8 is locked and the housing 3 is twisted is also low compared to a case where the high-speed gear ratio is selected.

If the cutoff frequency of the filter 62 on a low-frequency side is fixed to a constant frequency fH, then the cutoff frequency may be higher than the twisted motion frequency during a low-speed rotation of the output shaft 8, which may disable the detection of the twisted motion during the low-speed rotation of the output shaft 8.

Meanwhile, if the cutoff frequency of the filter 62 on the low-frequency side is set to frequency fL, which is lower than the twisted motion frequency during the low-speed rotation of the output shaft 8, then the twisted motion can be detected during the low-speed rotation of the output shaft 8. In this case, however, sufficient removal of a noise component having a frequency lower than the twisted motion frequency becomes impossible during a high-speed rotation of the output shaft 8, which may lead to an erroneous detection of the twisted motion.

The first twisted motion detecting process enables a preferable detection of the twisted motion by changing the cutoff frequency of the filter 62 between the first cutoff frequency (the frequency fH) and the second cutoff frequency (the frequency fL) in accordance with the selected gear ratio.

For a preferable detection of the twisted motion, the threshold used in S170 may be changed instead of changing the cutoff frequency. In this case, the control circuit 50 executes a second twisted motion detecting process shown in FIG. 4B.

Figure 4B:
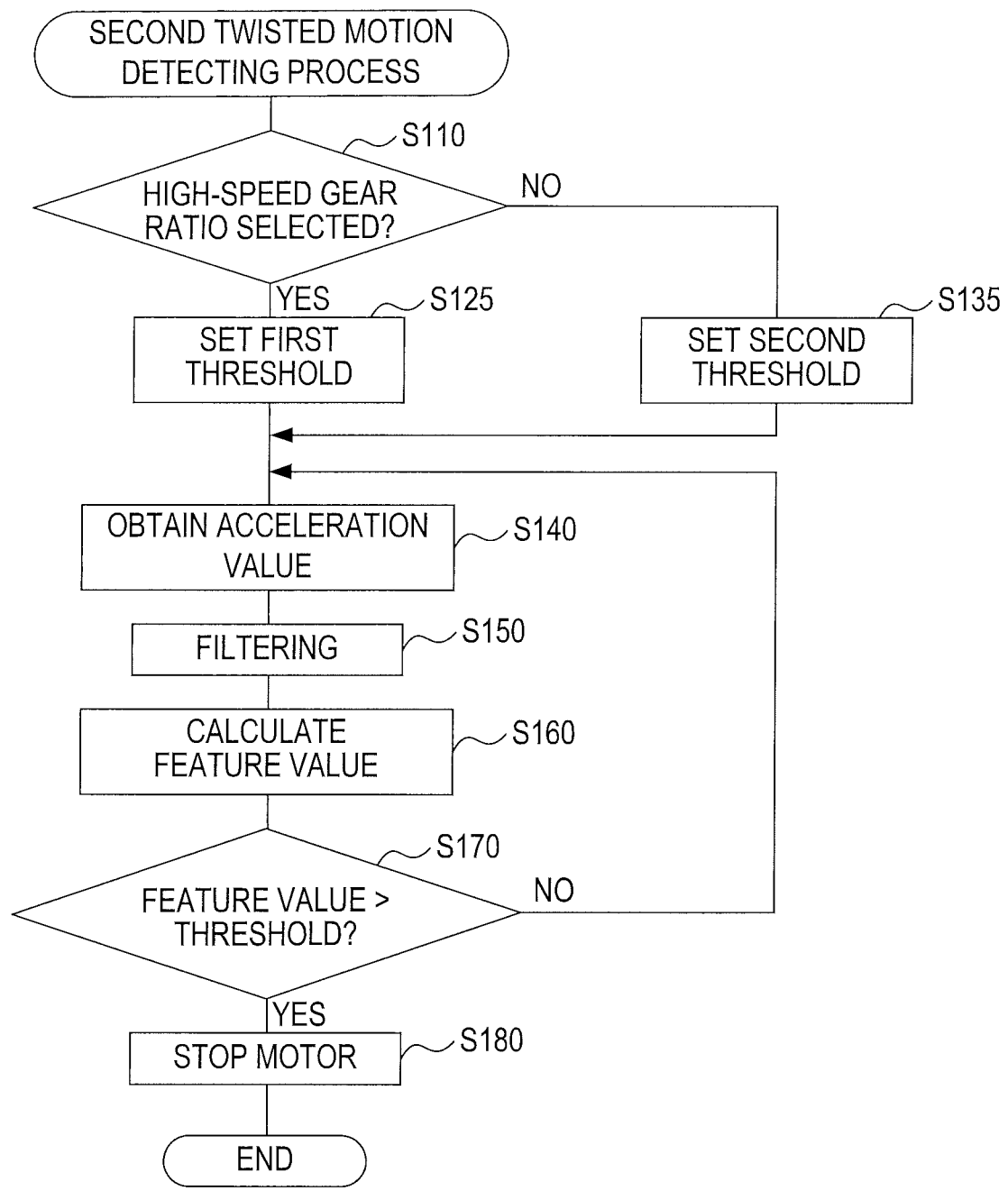
FIG. 4B shows a flow chart of a second twisted motion detecting process.

In the second twisted motion detecting process, as shown in FIG. 4B, if the control circuit 50 determines that the gear ratio selected in S110 is the high-speed gear ratio (S110: YES), then the control circuit 50 proceeds to S125, sets the first threshold mentioned above, and proceeds to S140. The first threshold is set to correspond to the high-speed gear ratio.

If the selected gear ratio is the low-speed gear ratio (S110:NO), then the control circuit 50 proceeds to S135, sets the second threshold mentioned above, and proceeds to S140. The second threshold is set to correspond to the low-speed gear ratio and is smaller than the first threshold.

In and after S140, the control circuit 50 executes the same processes as those in the first twisted motion detecting process. Processes from S110 to S130 in the first twisted motion detecting process and processes from S110 to S135 in the second twisted motion detecting process function as one example of the reference level changer in the present disclosure.

As explained above, difficulties in detecting the twisted motion can be reduced by setting either the first threshold or the second threshold in accordance with the selected gear ratio.

Figure 6A:
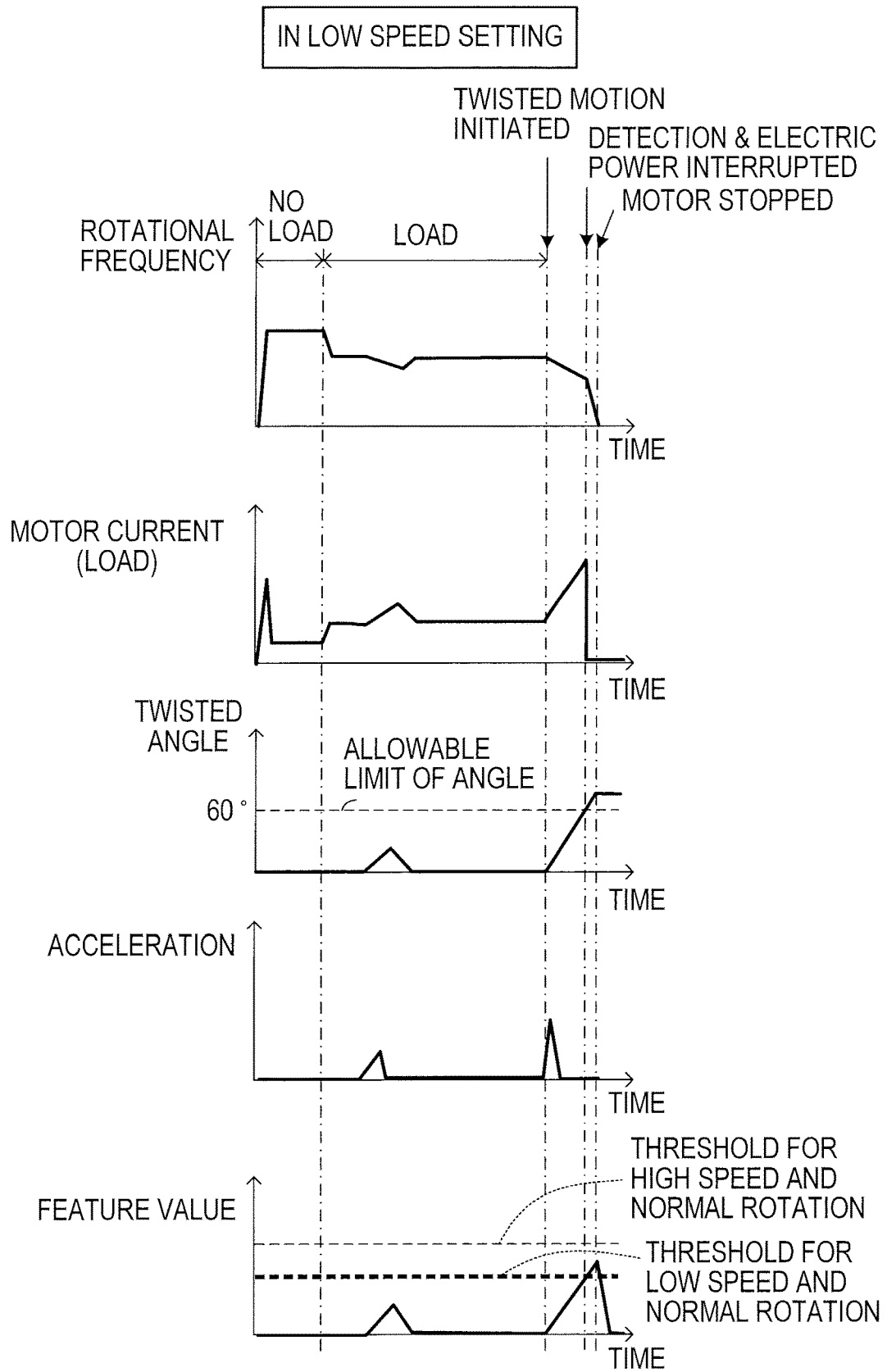
FIG. 6A is an explanatory diagram of an operation to change thresholds in accordance with the rotational speed of the output shaft.
Figure 6B:
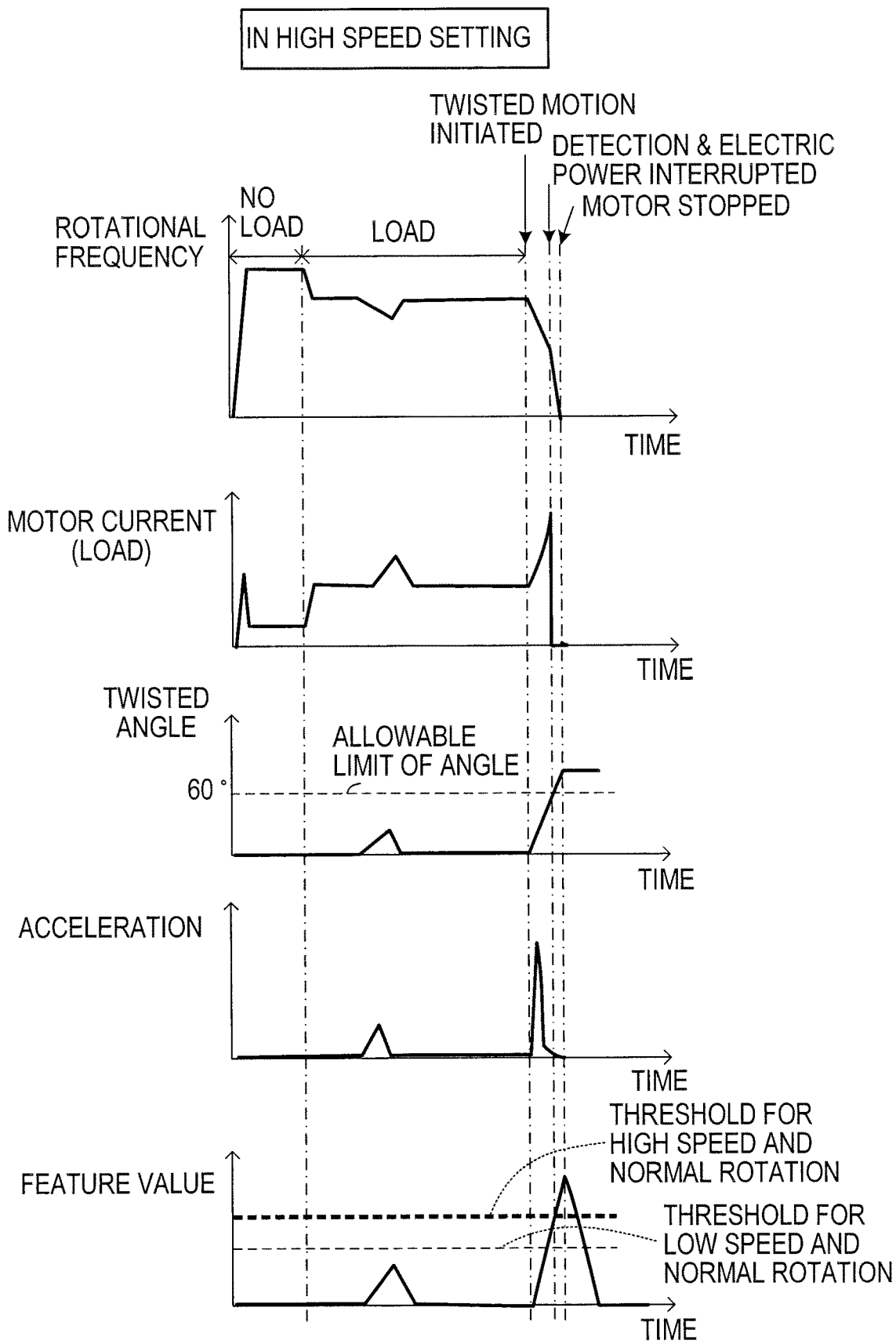
FIG. 6B is an explanatory diagram of an operation to change the thresholds in accordance with the rotational speed of the output shaft.

FIGS. 6A and 6B show the rotational frequency of the output shaft 8, the motor current, the twisted angle, the rotational acceleration, and the feature value during a drilling operation with the electric working machine 1. These factors change (or vary) in accordance with the selected gear ratio.

As it is obvious from FIGS. 6A and 6B, the acceleration and the feature value generated in the twisted motion are great when the high-speed gear ratio is selected and the output shaft 8 rotates at a high speed compared to when the low-speed gear ratio is selected and the output shaft 8 rotates at a low speed.

Thus, if the set threshold is fixed, the control circuit 50 may not be able to detect the twisted motion when the low-speed gear ratio is selected, or, the control circuit 50 may erroneously detect the twisted motion when the high-speed gear ratio is selected.

However, the control circuit 50 executing the second twisted motion detecting process can set the first threshold or the second threshold in accordance with the selected gear ratio. More specifically, the first threshold, that is the threshold for high speed and normal rotation shown in FIG. 6B, is set when the high-speed gear ratio; the second threshold, that is the threshold for low speed and normal rotation shown in FIG. 6A, is set when the low-speed gear ratio is selected. Accordingly, the control circuit 50 can accurately detect the twisted motion without being influenced by the selected gear ratio and thus by the rotational frequency of the output shaft 8.

In the first embodiment, both the cutoff frequency and the threshold can be changed in accordance with the selected gear ratio by combining the first twisted motion detecting process with the second twisted motion detecting process.

Second Embodiment

In the first embodiment, the cutoff frequency and/or the threshold are/is changed in accordance with the selected gear ratio as mentioned above.

In the second embodiment, the cutoff frequency or the threshold is changed in accordance with the operated level of the trigger SW 10.

Figure 7A:
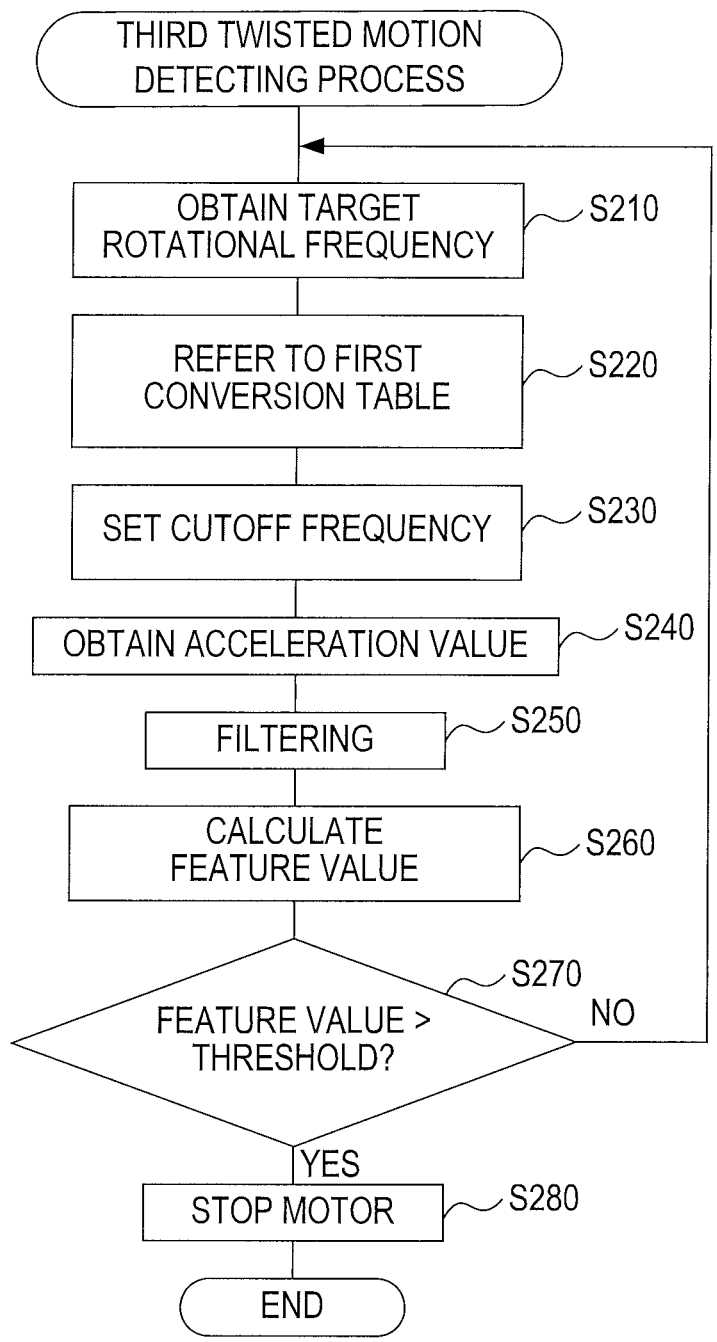
FIG. 7A shows a flow chart of a third twisted motion detecting process.

In the second embodiment, the control circuit 50 executes a third twisted motion detecting process shown in FIG. 7A.

As shown in FIG. 7A, the control circuit 50 obtains, at S210, the target rotational frequency of the motor 30 corresponding to the operated level of the trigger SW 10.

In the next S220, the control circuit 50 calculates the cutoff frequency of the filter 62 using a first conversion table based on the target rotational frequency obtained in S210. The first conversion table is preset. In the first conversion table, various target rotational frequencies (or various set rotational frequencies) are set individually and associated with various cutoff frequencies so that the cutoff frequency increases or decreases in response to the target rotational frequency (or set rotational frequency) increasing or decreasing.

In the subsequent S230, the control circuit 50 sets the cutoff frequency calculated in S220 to the filter 62 for the filtering process in S250 and proceeds to S240.

In and after S240, the control circuit 50 executes the processes from S240 to S280 in the similar way to the processes from S140 to S180 of the first twisted motion detecting process.

Except that, if the control circuit 50 determines in S270 that the feature value is equal to or less than the threshold (S270: NO), then the control circuit 50 proceeds to S210. This is because the target rotational frequency obtained in S210 is set in accordance with the operated level of the trigger SW 10, which can vary during the drive of the motor 30.

As explained above, the control circuit 50 in the second embodiment sets the cutoff frequency of the filter 62 based on the target rotational frequency that is set in accordance with the operated level of the trigger SW 10.

Thus, the cutoff frequency is changed in accordance with the target rotational frequency of the motor 30, in other words, the operated level of the trigger SW 10, which enables the control circuit 50 to preferably detect the twisted motion regardless of changes in the twisted motion frequency in accordance with a rotating state of the output shaft 8.

As mentioned above, in the third twisted motion detecting process, the control circuit 50 changes the cutoff frequency of the filter 62 based on the target rotational frequency that is set in accordance with the operated level of the trigger SW 10. However, the control circuit 50 may execute a fourth twisted motion detecting process shown in FIG. 7B to thereby change the threshold instead of changing the cutoff frequency.

Figure 7B:
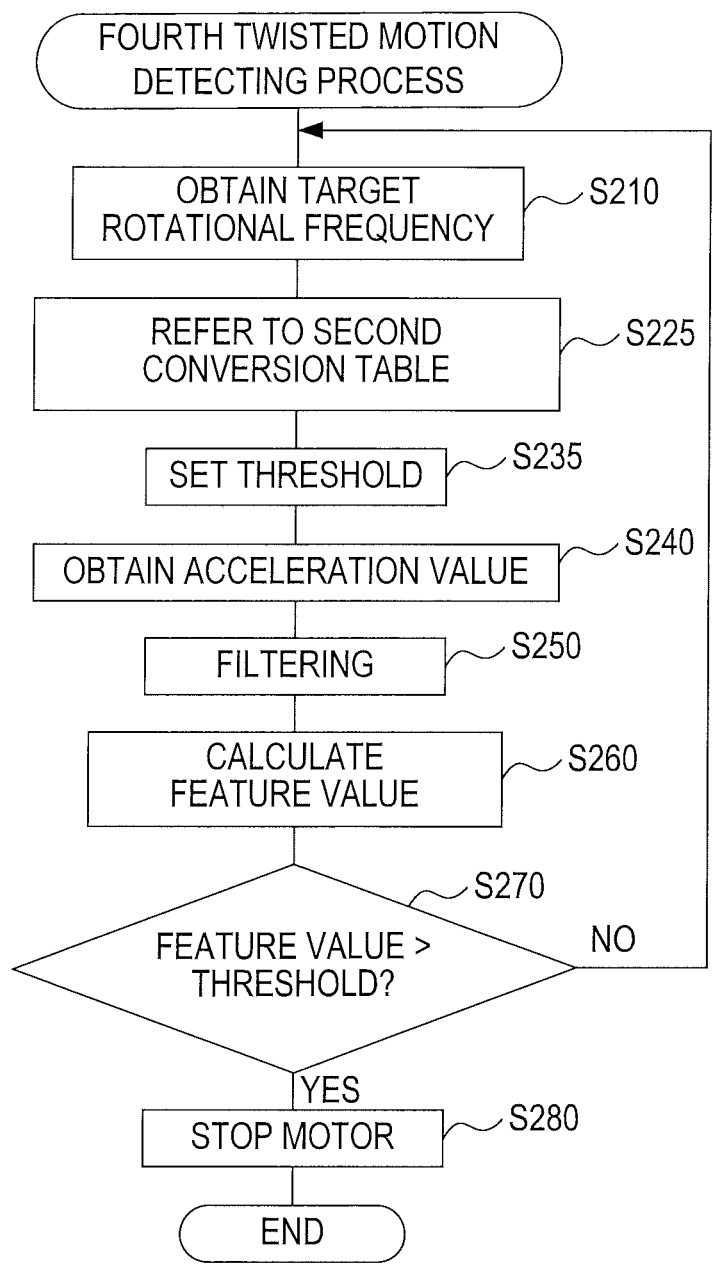
FIG. 7B shows a flow chart of a fourth twisted motion detecting process.

As shown in FIG. 7B, the control circuit 50 executing the fourth twisted motion detecting process obtains, in S210, the target rotational frequency of the motor 30 corresponding to the operated level of the trigger SW 10 and proceeds to S225.

In S225, the control circuit 50 determines the threshold to use in the determination process in S270 based on the target rotational frequency with reference to a second conversion table, sets the threshold in S235, and proceeds to S240. The second conversion table is preset. In the second conversion table, various target rotational frequencies are set individually and associated with various thresholds so that the threshold increases or decreases in response to the target rotational frequency increasing or decreasing.

As a result of setting the threshold in accordance with the target rotational frequency as explained above, the threshold can be set in accordance with the rotational frequency of the output shaft 8 as shown in FIGS. 6A and 6B during operations such as the drilling operation similarly to the first embodiment. Thus, the second embodiment can also achieve the similar effect as the first embodiment.

The processes from S210 to S230 in the third twisted motion detecting process or the processes from S210 to S235 in the fourth twisted motion detecting process serve as the reference level changer in the present disclosure.

In the second embodiment, the control circuit 50 obtains, in S210, the target rotational frequency in accordance with the operated level of the trigger SW 10 and sets the cutoff frequency or the threshold based on the target rotational frequency.

However, if the electric working machine 1 includes the transmission 34 as in the first embodiment, then the target rotational frequency of the motor 30 and the rotational frequency of the output shaft 8 do not correspond to each other due to the selected gear ratio.

In this case, the control circuit 50 may estimate the rotational frequency of the output shaft 8 in S210 based on the target rotational frequency corresponding to the operated level of the trigger SW 10 and the selected gear ratio and, in S220 and S225, may set the cutoff frequency or the threshold based on the estimated rotational frequency.

In the second embodiment, both the cutoff frequency and the threshold may be changed in accordance with the operated level of the trigger SW 10 (in other words, in accordance with the target rotational frequency of the motor 30 or the output shaft 8) by combining the third twisted motion detecting process with the fourth twisted motion detecting process.

Third Embodiment

The electric working machine 1 shown in FIG. 1 may be configured to switch the operation mode of the electric working machine 1 into a drill mode or a driver mode by the user make a manual operation on the operation button 26 or 28 disposed on the operation panel 20. The electric working machine 1 may be configured to change the fastening torque of a screw in the driver mode.

Figure 8:
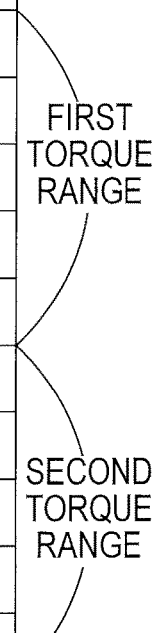
FIG. 8 is an explanatory diagram showing an upper limit rotational speed that is changeable in accordance with a torque setting of an electronic clutch.

In this case, as shown in FIG. 8, as for the drill mode, an upper limit rotational frequency of the output shaft 8 is defined in accordance with the selected gear ratio of the transmission 34; and as for the driver mode, an upper limit rotational frequency of the output shaft 8 is defined in accordance with a set torque and the selected gear ratio.

The driver mode includes a first torque range and a second torque range. In the first torque range, a torque setting value ranges from 1 to 5 and a target torque is low. In other words, the first torque range is set such that the upper limit rotational frequency of the output shaft 8 decreases in accordance with a decrease in the target torque.

In the second torque range, the torque setting value ranges from 6 to 10 and the target torque is greater than that in the first torque range. In other words, in the second torque range, the upper limit rotational frequency of the motor 30 is set to a maximum rotational frequency, the same as in the drill mode, so as not to substantially limit the rotation of the motor 30.

As explained above, the rotational frequency of the output shaft 8 is limited in accordance with the set torque for the purpose of achieving a function of an electronic clutch. The electronic clutch stops the motor 30 when an output torque of the output shaft 8 exceeds the set torque.

The electronic clutch limits the rotational frequency of the output shaft 8 in accordance with the set torque. Thus, accurate detections of the twisted motion may be hindered due to the limitations on the rotational frequency.

In the third embodiment, the cutoff frequency or the threshold is appropriately set and the twisted motion is accurately detected in the driver mode where the tightening torque of a screw is set.

Hereinafter, a fifth twisted motion detecting process executed in the third embodiment will be explained.

Figure 9A:
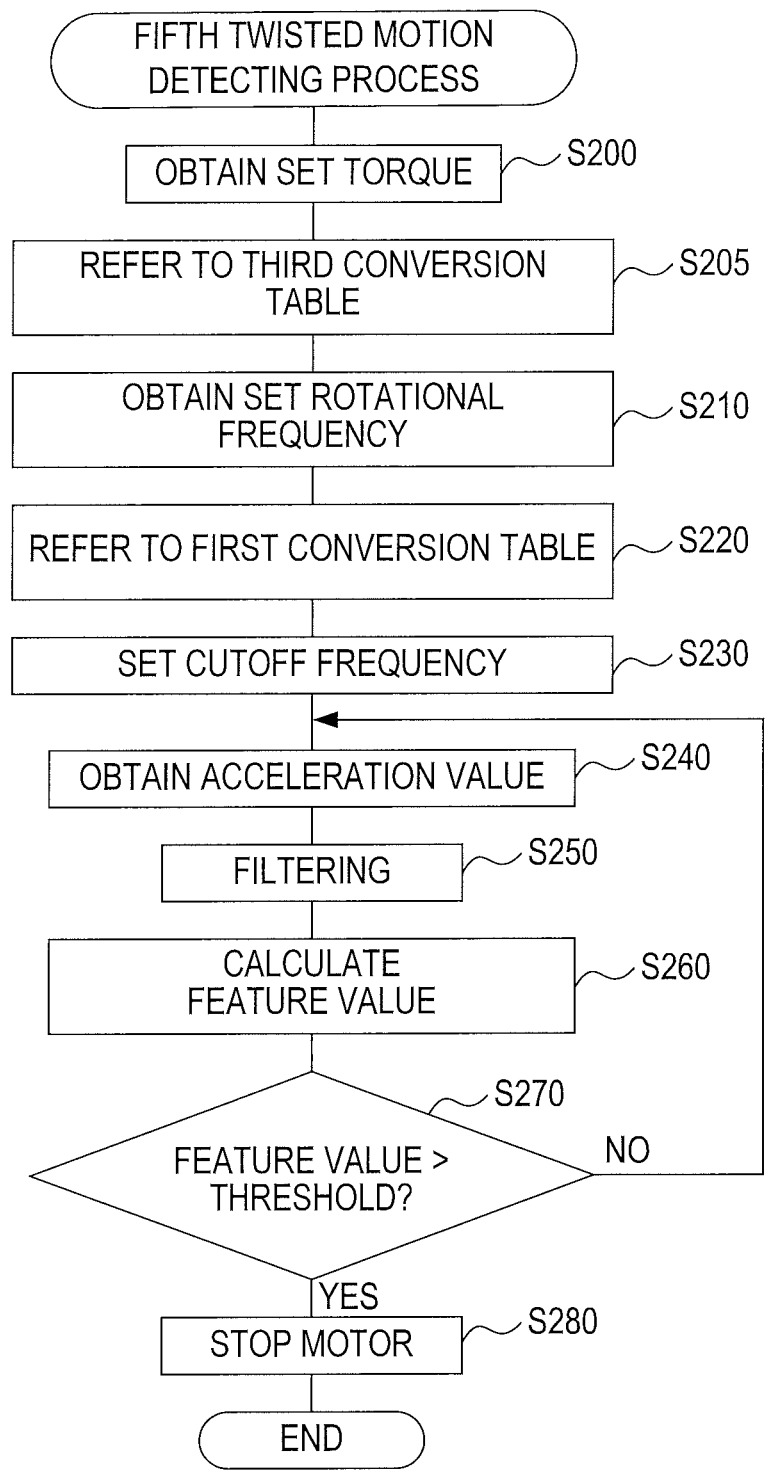
FIG. 9A shows a flow chart of a fifth twisted motion detecting process.

As shown in FIG. 9A, in the fifth twisted motion detecting process, the control circuit 50 first obtains in S200 the set torque for the driver mode from the motor controller 51. After obtaining the set torque, the control circuit 50 proceeds to S205.

In S205, the control circuit 50 calculates the upper limit rotational frequency of the motor 30 based on the set torque obtained in S200, the selected gear ratio of the transmission 34, and a third conversion table illustrated in FIG. 8. If the operation mode of the electric working machine 1 is set to the drill mode, then the control circuit 50 calculates the upper limit rotational frequency that corresponds to the selected gear ratio of the transmission 34.

Once completing the calculation of the upper limit rotational frequency, the control circuit 50 proceeds to S210, obtains the upper limit rotational frequency as a set rotational frequency, and proceeds to S220. The set rotational frequency is used to set the cutoff frequency of the filter 62.

In and after S220, the control circuit 50 executes the processes from S220 to S280 in the same order as in the third twisted motion detecting process shown in FIG. 7A.

If the control circuit 50 determines that the feature value is equal to or less than the threshold in S270, then the control circuit 50 proceeds to S240. This is because the set rotational frequency obtained in S210 is set corresponding to the set torque for the electronic clutch, and the set torque does not change during the drive of the motor 30.

According to the fifth twisted motion detecting process, if the operation mode of the electric working machine 1 is set to the driver mode and the upper limit rotational frequency of the output shaft 8 is limited in accordance with the set torque, then the cutoff frequency of the filter 62 is set in accordance with the upper limit rotational frequency.

Thus, in the third embodiment, the twisted motion of the electric working machine 1 can be favorably detected even when the set torque of the output shaft 8 is changed.

Figure 9B:
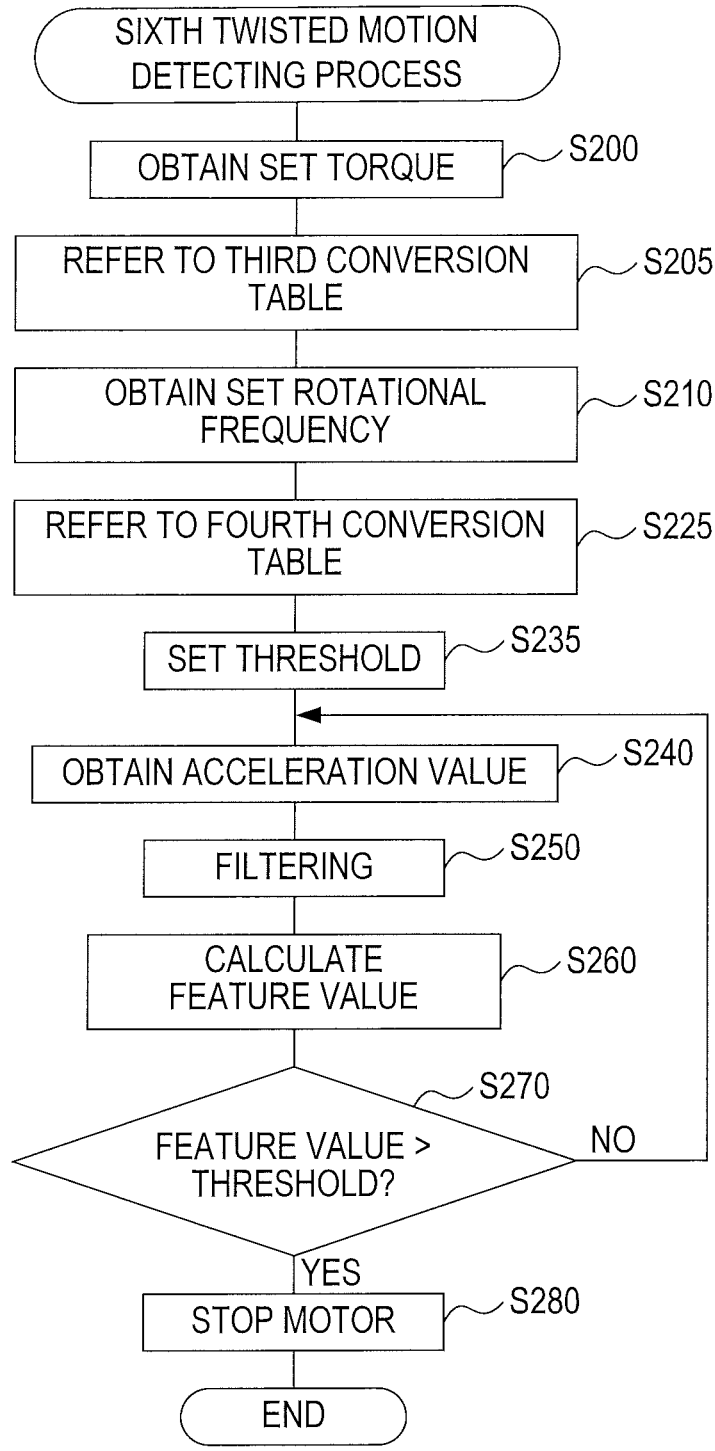
FIG. 9B shows a flow chart of a sixth twisted motion detecting process.

The control circuit 50 may execute a sixth twisted motion detecting process shown in FIG. 9B in place of the fifth twisted motion detecting process. In the sixth twisted motion detecting process, as shown in FIG. 9B, the control circuit 50 obtains the set torque in S200 and proceeds to S205. In S205, the control circuit 50 calculates the upper limit rotational frequency of the motor 30 with reference to the third conversion table. Once completing the calculation of the upper limit rotational frequency, the control circuit 50 executes the processes from S210 to S235 in the same order as in the fourth twisted motion detecting process shown in FIG. 7B.

In other words, in S210, the control circuit 50 obtains the upper limit rotational frequency calculated in S205 as the set rotational frequency. Based on the set rotational frequency, the control circuit 50 sets the threshold to be used in the process of S270 with reference to a fourth conversion table, and proceeds to S240. The fourth conversion table is preset. In the fourth conversion table, various set rotational frequencies are set individually and associated with various thresholds so that the threshold increases or decreases in response to the set rotational frequency increasing or decreasing.

Thus, in the sixth twisted motion detecting process, the threshold for detecting the twisted motion can be set in accordance with the upper limit rotational frequency when the operation mode of the electric working machine 1 is set to the driver mode and the upper limit rotational frequency of the output shaft 8 is limited in accordance with the set torque.

Thus, in the third embodiment, the twisted motion of the electric working machine 1 can be favorably detected even though the set torque of the output shaft 8 is changed.

The processes from S200 to S230 in the fifth twisted motion detecting process, or the processes from S200 to S235 in the sixth twisted motion detecting process function as one example of the reference level changer in the present disclosure. In the third embodiment, the operation panel 20 corresponds to one example of the upper limit torque setter in the present disclosure.

Further, the fifth twisted motion detecting process can be combined with the sixth twisted motion detecting process, and both of the cutoff frequency and the threshold can be changed in accordance with the set torque.

In the third embodiment, to achieve the function of the electronic clutch in the driver mode, the user adjusts the set torque of the output shaft 8 through the operation panel 20, and the motor controller 51 limits the upper limit rotational frequency of the output shaft 8 in accordance with the set torque.

The motor controller 51 may control the drive of the motor 30 in accordance with the set torque adjusted through the operation panel 20.

In this case, in the sixth twisted motion detecting process, the control circuit 50 may obtain the set torque in S200, proceed to S235, and set the threshold for detecting the twisted motion in accordance with the obtained set torque.

In S235, the control circuit 50 sets the threshold to decrease as the set torque, in other words the output torque of the output shaft 8, increases.

Such a twisted motion detecting process can facilitate detection of the twisted motions of the electric working machine 1 when the set torque is high and thus the output shaft 8 is rotationally driven at a high torque.

The control circuit 50 can promptly detect the twisted motion and stop the motor 50 when a torque is high and the twisted motion occurs, for example, when the electric working machine 1 tightens a screw which is already tightened at a high torque.

Fourth Embodiment

In the first to third embodiments, the reference level of the twisted motion detector 60 in each embodiment is changed in accordance with the gear ratio, the target rotational frequency, or the torque respectively set by the user's manual operation on the gear ratio select SW 16, the trigger SW 10, or the operation panel 20 as mentioned above.

The reference level, specifically, the cutoff frequency of the filter 62, or the threshold to detect the twisted motion may be set in accordance with the load imposed on the output shaft 8 and thus on the motor 30 by a work piece.

When the load is large, the rotational frequency of the output shaft 8 decreases and the torque imposed on the output shaft 8 increases. As a result, the housing 3 generates a large reaction force in the circumferential direction of the output shaft 8 when the output shaft 8 is locked, which makes the operator easily twisted by the reaction force.

Figure 10A:
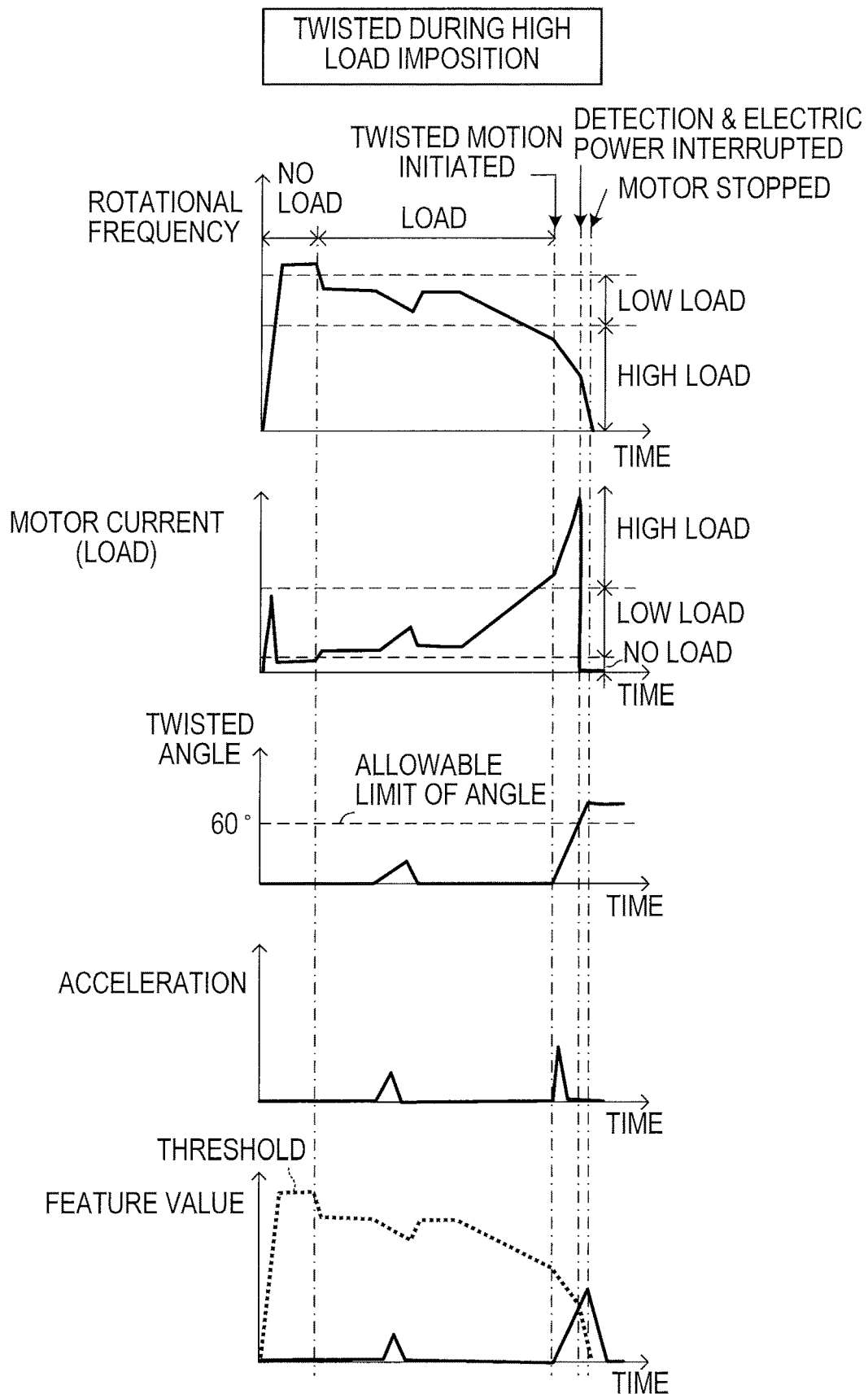
FIG. 10A is an explanatory diagram of an operation to change a threshold in accordance with a load imposed on an output shaft in a fourth embodiment.
Figure 10B:
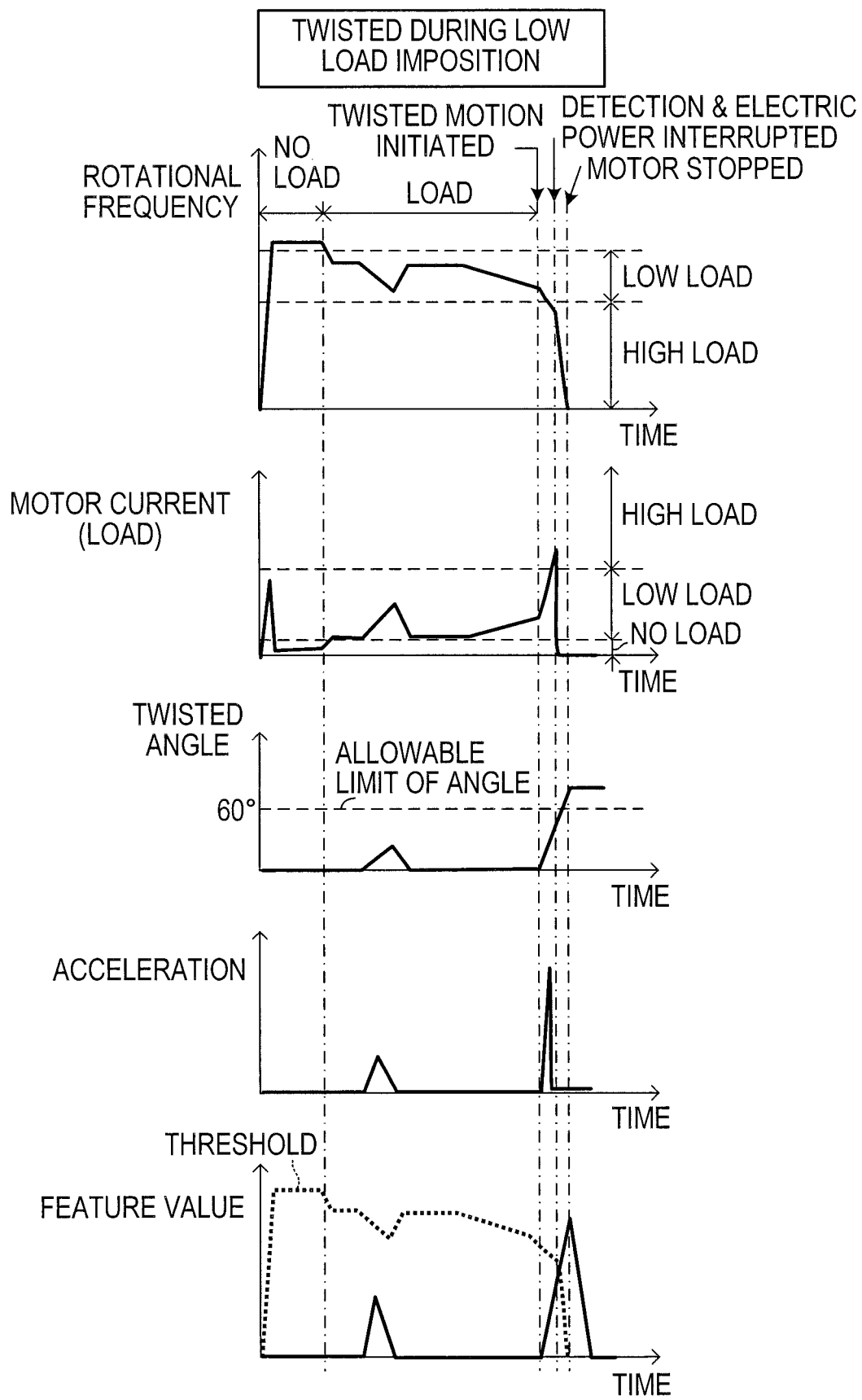
FIG. 10B is an explanatory diagram of an operation to change the threshold in accordance with a load imposed on the output shaft in the fourth embodiment.

Thus, as shown in FIGS. 10A and 10B, when a high load is imposed on the output shaft 8, detection of the twisted motion may be facilitated by decreasing the threshold compared to the threshold when a low load is imposed on the output shaft 8. Or, the cutoff frequency of the filter 62 may alternatively be decreased when a high load is imposed on the output shaft 8.

The magnitude of the load imposed on the output shaft 8 by the work piece can be detected based on a physical quantity such as the rotational frequency of the output shaft 8 or the motor 30, a counter electromotive force generated in the motor 30, and the motor current or electric power supplied to the motor 30.

In the fourth embodiment, the physical quantity is detected, and the cutoff frequency of the filter 62 or the threshold for detecting the twisted motion is changed in accordance with the detected physical quantity.

The control circuit 50 may execute a seventh twisted motion detecting process or an eighth twisted motion detecting process.

Figure 11A:
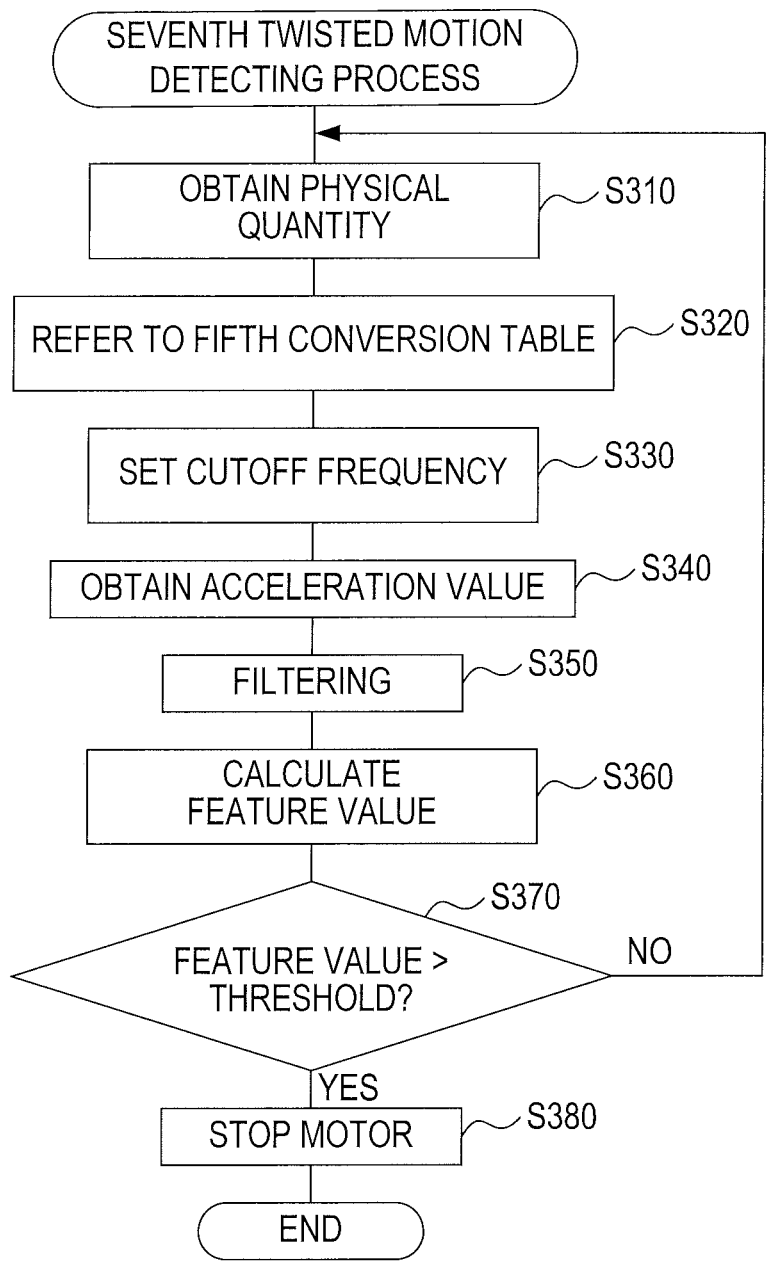
FIG. 11A shows a flow chart of a seventh twisted motion detecting process.

In the seventh twisted motion detecting process, as shown in FIG. 11A, the control circuit 50 first obtains the physical quantity in S310. The control circuit 50 may obtain, as the physical quantity, the rotational frequency of the motor 30 based on the rotation detection signal, the magnitude of the motor current based on the electric current detection signal, the magnitude of the electric power supplied to the motor 30 based on the electric current detection signal and the voltage detection signal, or the magnitude of the respective electromotive forces generated in the U-phase winding, the V-phase winding, and the W-phase winding. The control circuit 50 obtains, in S310, an actual rotational frequency of the output shaft 8 calculated based on the rotational frequency of the motor 30 obtained from the motor controller 51 and the selected gear ratio, for example.

In the following S320, the control circuit 50 calculates the cutoff frequency of the filter 62 based on the physical quantity obtained in S310 (e.g., the actual rotational frequency) and a fifth conversion table, and proceeds to S330. The fifth conversion table is preset. In the fifth conversion table, various physical quantities are set individually and associated with various cutoff frequencies so that the cutoff frequency decreases in response to the load increasing.

The processes from S330 to S380 are executed in the same order as the processes from S230 to S280 shown in FIGS. 7A and 9A. However, if the control circuit 50 determines in S370 that the feature value is equal to or less than the threshold (S370: NO), then the control circuit 50 proceeds to S310 and executes the processes from S310 to S370.

Figure 11B:
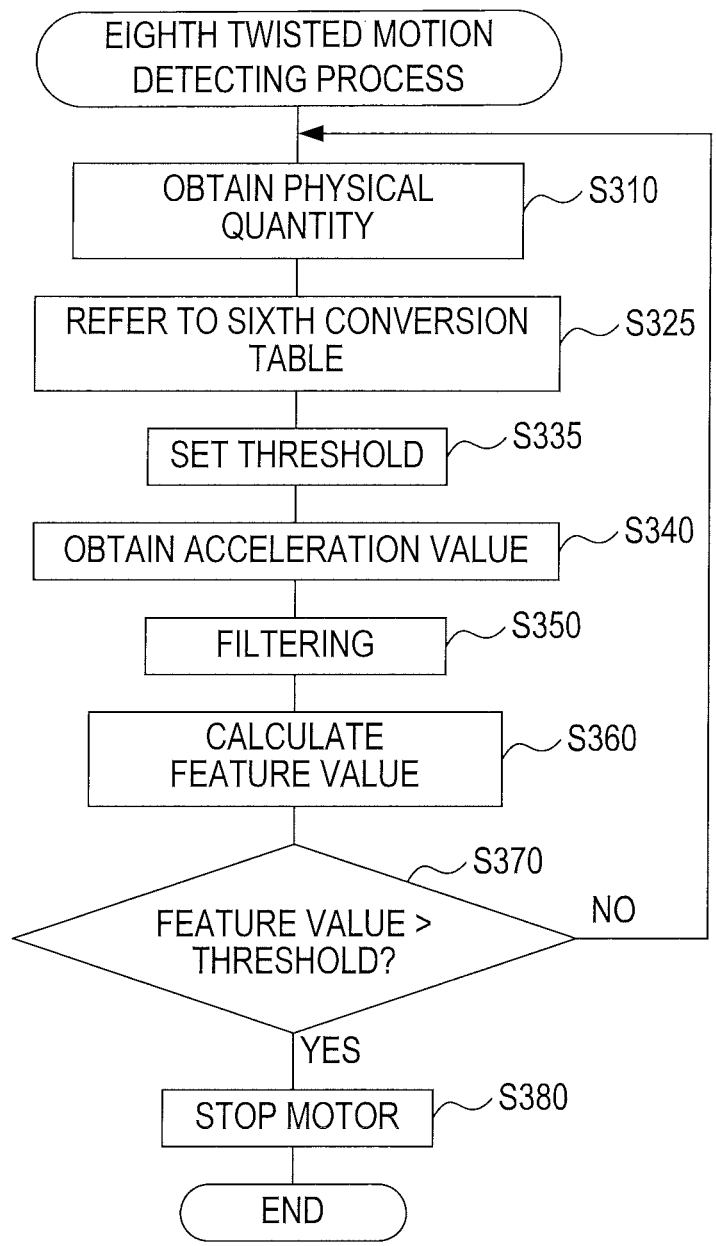
FIG. 11B shows a flow chart of a eighth twisted motion detecting process.

Similarly to the seventh twisted motion detecting process, in the eighth twisted motion detecting process, as shown in FIG. 11B, the control circuit 50 obtains in S310 the physical quantity (e.g., the actual rotational frequency of the output shaft 8).

In the following S325, the control circuit 50 calculates the threshold based on the physical quantity obtained in S310 and a sixth conversion table, and proceeds to S335. The sixth conversion table is preset. In the sixth conversion table, various physical quantities are set individually and associated with various thresholds so that the threshold decreases in response to the load increasing.

The processes from S335 to S380 are executed in the same order as the processes from S235 to S280 shown in FIGS. 7B and 9B. However, if the control circuit determines in S370 that the feature value is equal to or less than the threshold (S370: NO), then the control circuit 50 proceeds to S310 and executes the processes from S310 to S370.

As explained above, in the fourth embodiment, the control circuit 50 measures the physical quantity (e.g., the actual rotational frequency of the output shaft 8) associated with the load imposed on the output shaft 8 during the drive of the motor 30. The control circuit 50 sets the cutoff frequency or the threshold based on the measured physical quantity.

When the actual rotational frequency is low and the output shaft 8 is rotating at a low speed, the cutoff rotational frequency or the threshold is decreased compared to those when the output shaft 8 is rotating at a high speed, for example.

As a result of this, the twisted motion can be favorably detected without in accordance with the load imposed on the output shaft 8.

As it is clear from FIGS. 10A and 10B, when a high load is imposed on the output shaft 8, the motor current increases compared to when a low load is imposed on the output shaft 8. Thus, the control circuit 50 may set the threshold to decrease as the motor current increases when setting the threshold based on the motor current.

Alternatively, the control circuit 50 may change the cutoff frequency so that the cutoff frequency decreases as the electric current increases.

Alternatively, the control circuit 50 may change the cutoff frequency or the threshold so that the cutoff frequency or the threshold decreases as the counter electromotive forces generated in the motor 30 or the electric power supplied to the motor 30 increases.

Both of the cutoff frequency and the threshold may be changed in accordance with a physical quantity such as the rotational frequencies, the magnitude of the motor current, the magnitude of the counter electromotive forces generated in the motor 30, or the magnitude of the electric power supplied to the motor 30, by combining the seventh twisted motion detecting process with the eighth twisted motion detecting process.

The processes from S310 to S330 in the seventh twisted motion detecting process or the processes from S310 to S335 in the eighth twisted motion detecting process function as one example of the reference level changer in the present disclosure. In the fourth embodiment, the rotation sensor 32, the current detection circuit 46, the battery voltage detector 48, and the control circuit 50 correspond to one example of the load detector in the present disclosure.

Fifth Embodiment

The rotation direction of the output shaft 8 can be set to the normal rotation direction or reverse rotation direction. The normal rotation direction agrees with the direction to tighten a screw. The reverse rotation direction agrees with the direction to loosen the screw.

Considering the grip force of the user on the grip 2, the upper limit rotational frequency of the motor 30 may vary in accordance with the rotation direction of the output shaft 8. For example, the upper limit rotational frequency of the motor 30 corresponding to the reverse rotation direction of the output shaft 8 may be set less than the upper limit rotational frequency corresponding to the normal rotation direction of the output shaft 8.

Figure 12A:
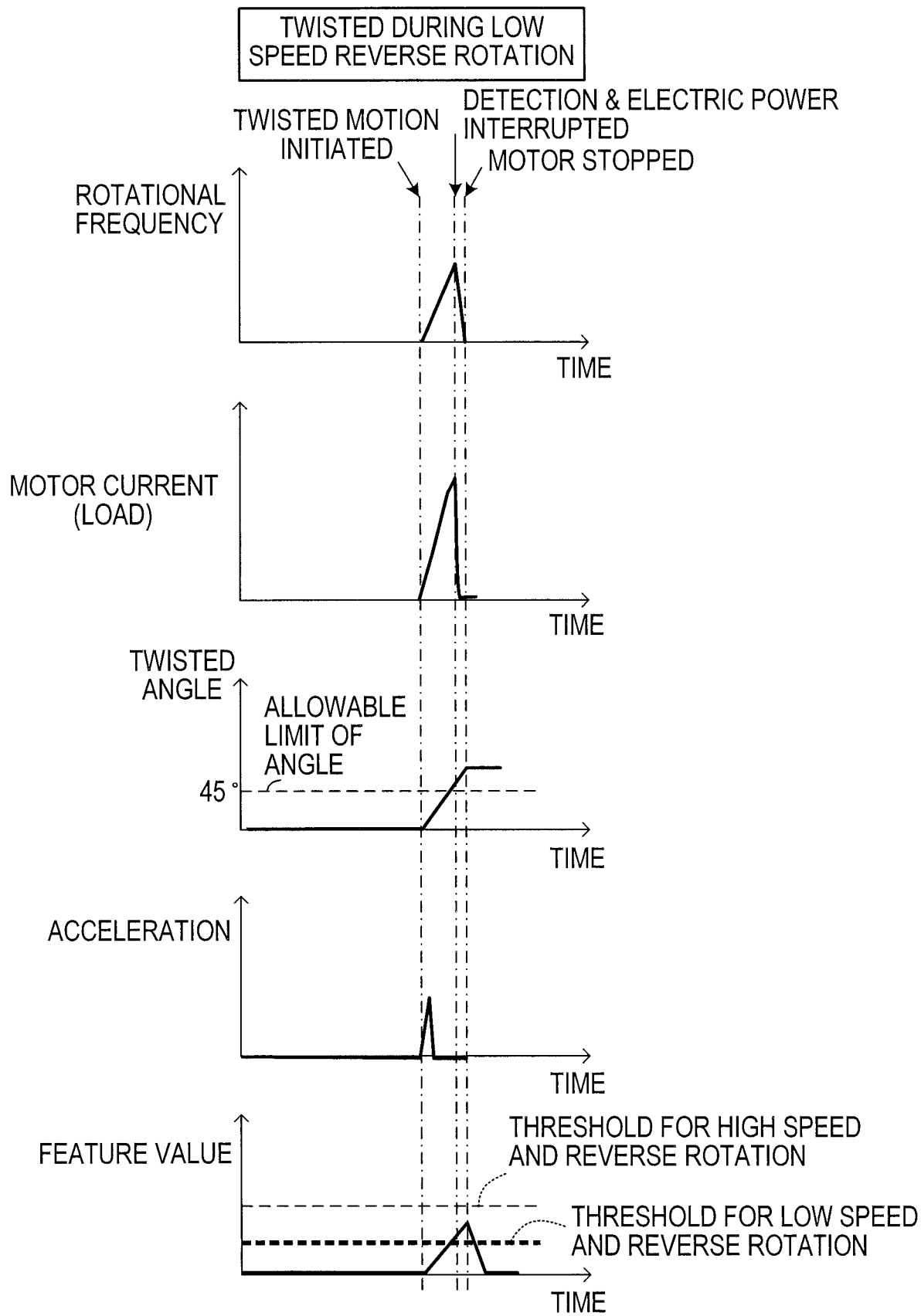
FIG. 12A is an explanatory diagram showing changes in thresholds from when an output shaft rotates in reverse rotation direction at a low speed in a fifth embodiment.
Figure 12B:
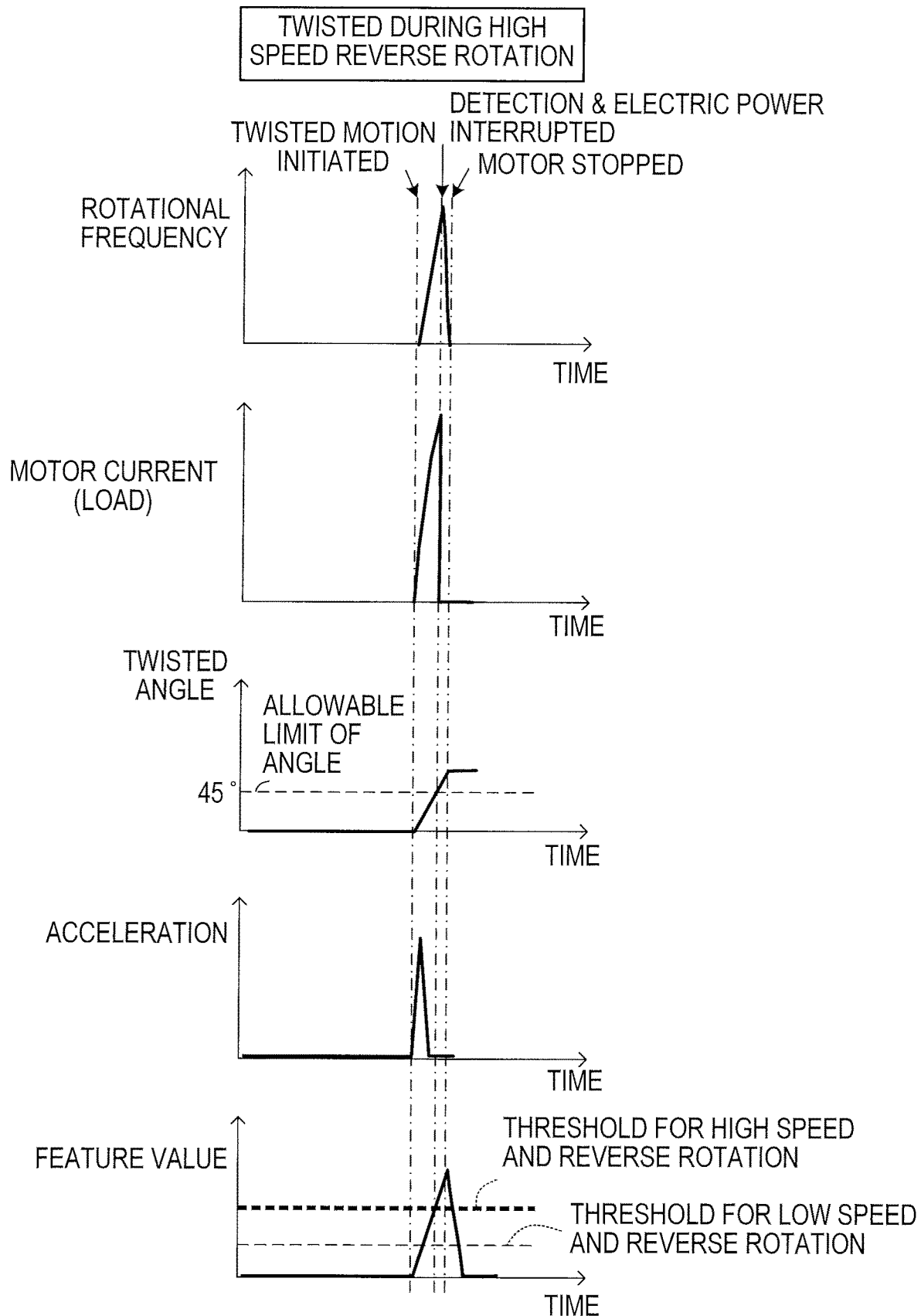
FIG. 12B is an explanatory diagram showing changes in thresholds from when the output shaft rotates in the reverse rotation direction at a high speed in the fifth embodiment.

Alternatively, the upper limit rotational frequency of the motor 30 corresponding to the normal rotation direction of the output shaft 8 may be set equal to the upper limit rotational frequency corresponding to the reverse rotation direction. As shown in FIGS. 12A and 12B, a large load is imposed on the output shaft 8 immediately after actuation of the motor 30 when the motor 30 rotates in the reverse rotation direction This is because the output shaft 8 is locked by the tightened screw immediately after actuation of the motor 30 as the reverse rotation direction corresponds to the direction to loosen the tightened screw as mentioned above.

Accordingly, it may be difficult to detect the twisted motion of the electric working machine 1 when the output shaft 8 rotates in the reverse rotation direction if the detection is based on a fixed cutoff frequency or a fixed threshold without in accordance with the rotation direction of the output shaft 8.

In the fifth embodiment, the cutoff frequency or the threshold is changed in accordance with the rotation direction, selected by the rotation direction select SW 12, of the motor 30 and thus of the output shaft 8.

Figure 13A:
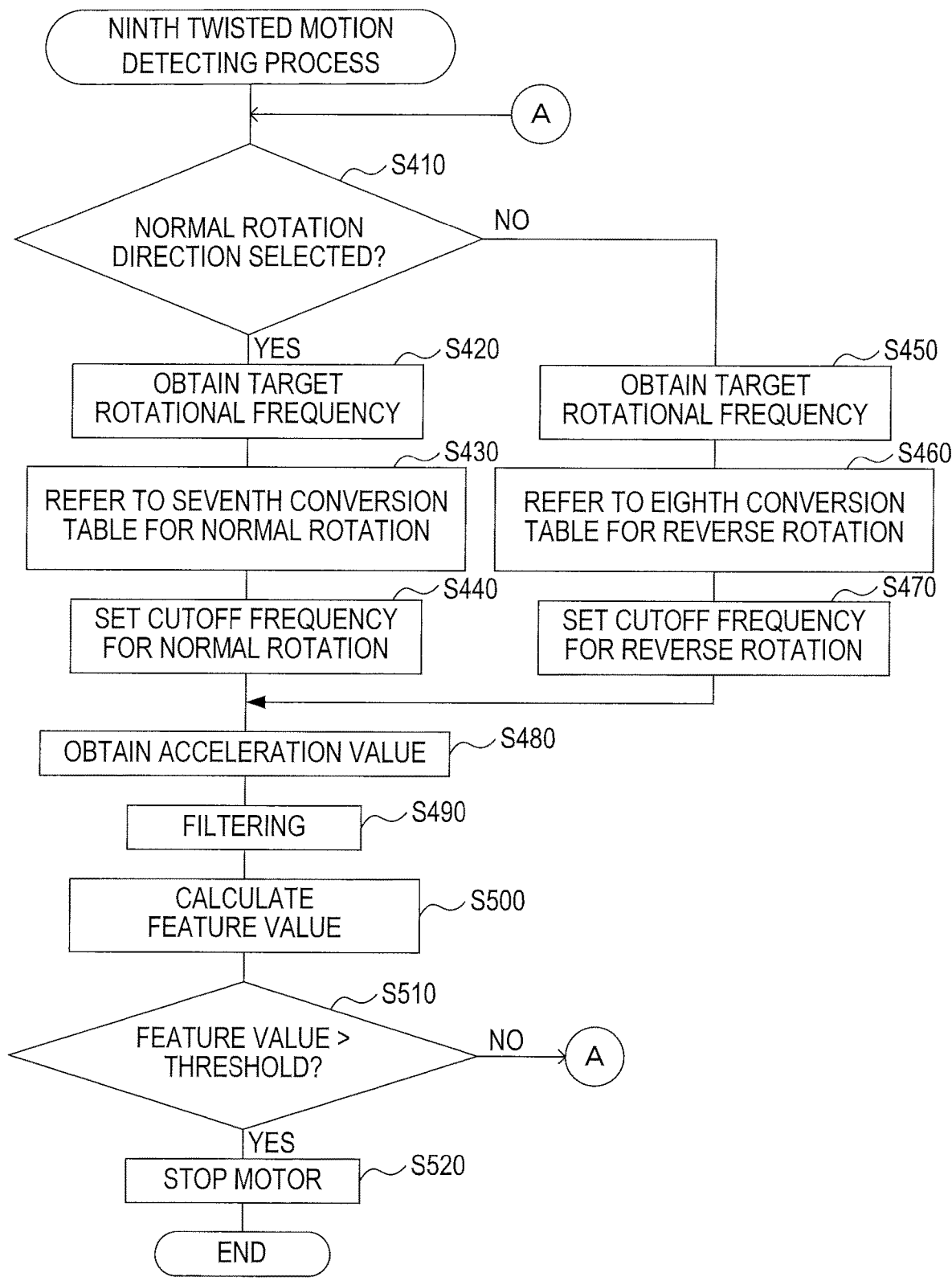
FIG. 13A shows a flow chart of a ninth twisted motion detecting process.

The control circuit 50 may execute a ninth twisted motion detecting process or a tenth twisted motion detecting process. In the ninth twisted motion detecting process, as shown in FIG. 13A, the control circuit 50 first obtains in S410 the rotation direction of the motor 30 from the rotation direction select SW 12 and determines whether the normal rotation direction is selected.

If the control circuit 50 determines that the normal rotation direction is selected (S410: YES), then the control circuit 50 proceeds to S420 and obtains a rotational frequency (target rotational frequency) that is set in accordance with the operated level of the trigger SW 10 in the normal rotation direction.

In the following S430, the control circuit 50 calculates the cutoff frequency based on the obtained target rotational frequency and a seventh conversion table. The seventh conversion table preset for the normal rotation direction. In the seventh conversion table, various target rotational frequencies are set individually and associated with various cutoff frequencies so that the cutoff frequency increases or decreases in response to the target rotational frequency increasing or decreasing.

In S440, the control circuit 50 sets the cutoff frequency calculated in S430 to a designated cutoff frequency and proceeds to S480. The designated cutoff frequency is used in the filtering process in S490.

If the control circuit 50 determines in S410 that the reverse rotation direction is selected (S410: NO), the control circuit 50 proceeds to S450 and obtains the target rotational frequency that is set in accordance with the operated level of the trigger SW 10 in the reverse rotation direction. The target rotational frequency in the reverse rotation direction is set less than the target rotational frequency in the normal rotation direction.

In the following S460, the control circuit 50 calculates the cutoff frequency based on the obtained target rotational frequency and an eighth conversion table. The eighth conversion table is preset for the reverse rotation direction. Cutoff frequencies set in the eighth conversion table are less than the respective cutoff frequencies set in the seventh conversion table.

In S470, the control circuit 50 sets the cutoff frequency calculated in S460 to the designated cutoff frequency and proceeds to S480.

The processes from S480 to S520 are executed in the same order as the processes from S240 to S280 in the third twisted motion detecting process shown in FIG. 7A. If the control circuit 50 determines in S510 that the feature value is equal to or less than the threshold (S510: NO), then the control circuit 50 proceeds to S410.

Figure 13B:
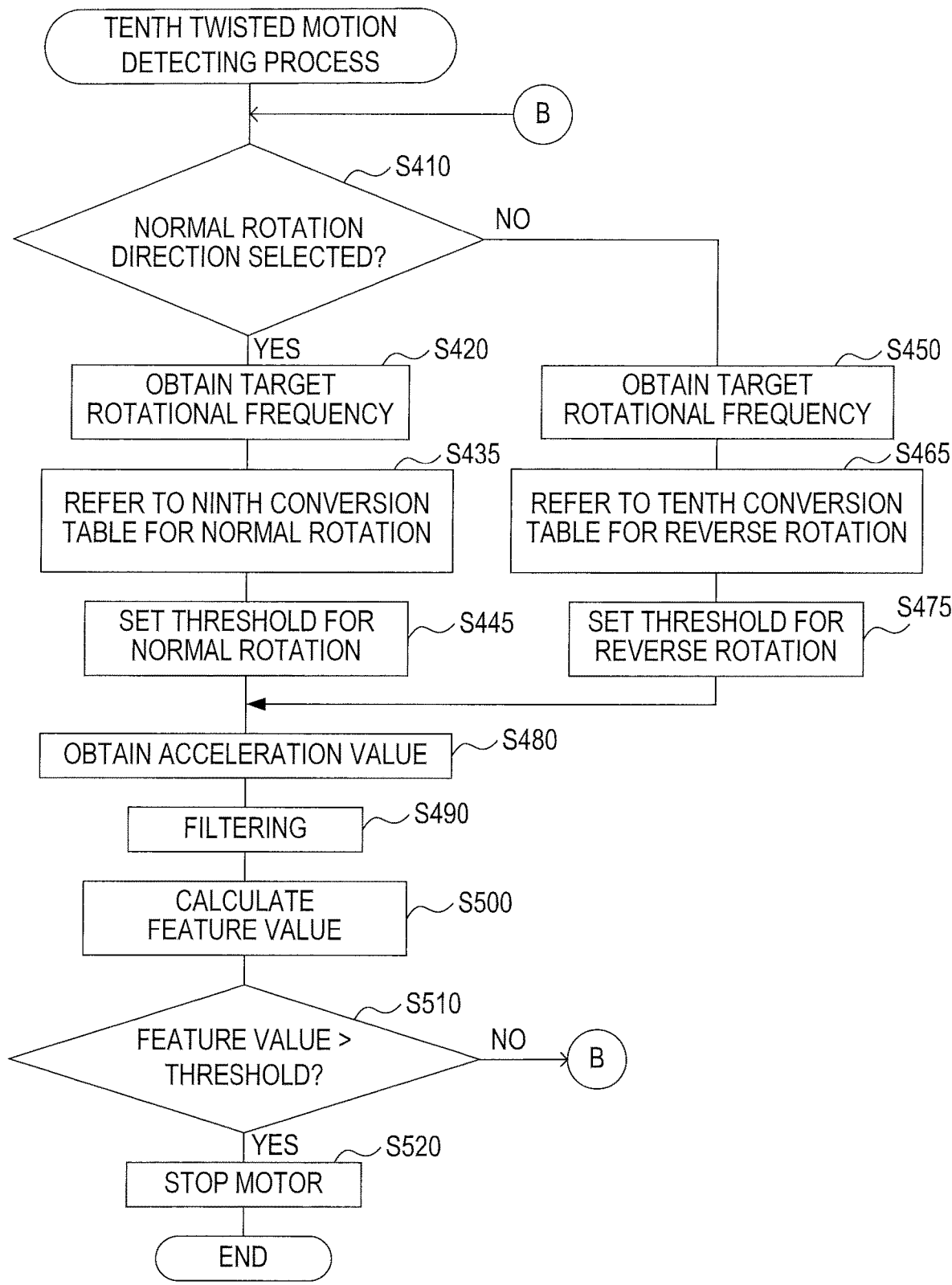
FIG. 13B shows a flow chart of a tenth twisted motion detecting process.

In the tenth twisted motion detecting process, as shown in FIG. 13B, the control circuit 50 obtains in S410 the rotation direction selected by the rotation direction select SW 12 and determines whether the normal rotation direction is selected in the same manner as the ninth twisted motion detecting process.

If the normal rotation direction is selected (S410: YES), then the control circuit 50 proceeds to S420, obtains the target rotational frequency that is set in accordance with the operated level of the trigger SW 10 in the normal rotation direction, and proceeds to S435.

In S435, the control circuit 50 calculated the threshold based on the target rotational frequency obtained in S420 and a ninth conversion table. The ninth conversion table is preset for the normal rotation direction. In the ninth conversion table, various target rotational frequencies are set individually and associated with various thresholds so that the threshold increases or decreases in response to the target rotational frequency increasing or decreasing.

In the following S445, the control circuit 50 sets the threshold calculated in S435 to a threshold for detecting the twisted motion in the normal rotation direction and proceeds to S480.

If the reverse rotation direction is selected in S410 (S410: NO), the control circuit 50 obtains in S450 the target rotational frequency that is set in accordance with the operated level of the trigger SW 10 in the reverse rotation direction and proceeds to S465.

In the following S465, the control circuit 50 calculates the threshold based on the obtained target rotational frequency and a tenth conversion table. The tenth conversion table is preset for the reverse rotation direction. Thresholds set in the tenth conversion table are less than the respective thresholds set in the ninth conversion table.

In S475, the control circuit 50 sets the threshold calculated in S465 to the threshold for detecting the twisted motion in the reverse rotation direction and proceeds to S480. The control circuit 50 then executes the processes from S480 to S520 in the same manner as the ninth twisted motion detecting process.

In the fifth embodiment, the cutoff frequency or the threshold is changed in accordance with the rotation direction of the motor 30. For example, as illustrated in FIGS. 12A and 12B, the threshold at a high-speed reverse rotation of the motor 30 is set to be less than the threshold at a high-speed normal rotation of the motor 30 (see FIGS. 6A and 6B). The threshold at a low-speed reverse rotation of the motor 30 is set to be less than the threshold at a low-speed normal rotation of the motor 30 (see FIGS. 6A and 6B).

As a result, detection of the twisted motion in the reverse rotation can be facilitated.

Additionally, both of the cutoff frequency and the threshold can be changed in accordance with the rotation direction of the motor 30 by combining the ninth twisted motion detecting process with the tenth twisted motion detecting process.

The processes from S410 to S470 in the ninth twisted motion detecting process or the processes from S410 to S475 in the tenth twisted motion detecting process function as one example of the reference level changer in the present disclosure. In the fifth embodiment, the rotation direction select SW 12 corresponds to one example of the rotation direction setter in the present disclosure.

Modified Examples

The first to the fifth embodiments of the present disclosure are explained above. Nevertheless, the present disclosure should not be limited by the first to the fifth embodiments and can be embodied in various modifications.

For example, in the first to the fifth embodiments, the reference level used in the twisted motion detector 60 (in other words, cutoff frequency and/or threshold) is changed in accordance with the selected gear ratio; the target rotational frequency that is set in accordance with the operated level of the trigger SW 10; the upper limit rotational frequency that is set in accordance with the set torque; or the rotation direction of the motor 30.

Nevertheless, the reference level may be optionally set by the user.

In this case, the electric working machine 1 may be configured to display the reference level on the indicator 24 by means of the operation buttons 26, 28 on the operation panel 20. The electric working machine 1 may also be configured to change the reference level by manual operations received by the operation buttons 26, 28.

Such configurations enable the user to manually adjust the reference level to facilitate the detection of the twisted motion in accordance with the rotational state of the motor 30 (and thus of the output shaft 8), which can change in accordance with the selected gear ratio and/or the target rotational frequency, and thereby improve the usability of the electric working machine 1.

As mentioned above, in the second embodiment, the reference level (that is, the cutoff frequency and/or threshold) used in the twisted motion detector 60 is changed based on the target rotational frequency, which is set in accordance with the operated level of the trigger SW 10.

Nevertheless, the electric working machine 1 may also include an upper limit speed setter that defines an upper limit rotational speed of the motor 30 (or of the output shaft 8) in addition to the trigger SW 10.

In this case, the reference level (the cutoff frequency and/or threshold) used in the twisted motion detector 60 may be changed in accordance with the rotational frequency (for example, the upper limit rotational frequency of the motor 30) set by the upper limit speed setter.

Figure 14:
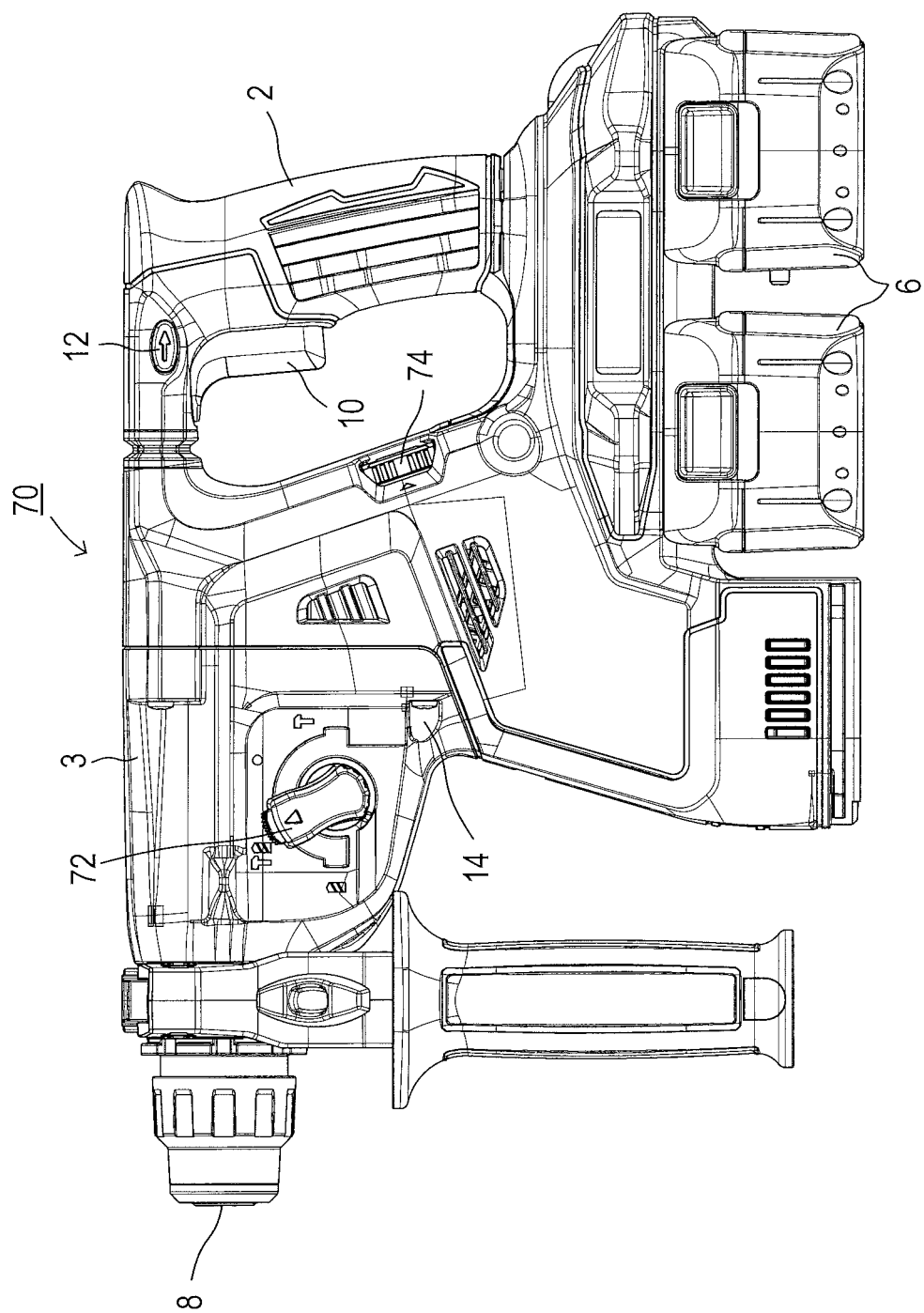
FIG. 14 is a side view of an external appearance of another electric working machine in a modified example.

For example, a hammer drill 70 illustrated in FIG. 14 includes a mode selector 72 and a dial 74 in addition to the trigger SW 10 and the rotation direction select SW 12. The mode selector 72 is disposed for the user to select the operation mode of the hammer drill 70. The dial 74 is disposed for the user to set the upper limit rotational frequency of the output shaft 8. The dial 74 corresponds to one example of the upper limit speed setter in the present disclosure.

The hammer drill 70 can set the upper limit rotational frequency of the output shaft 8 depending on the rotated position of the dial 74. Thus, the hammer drill 70 may change the reference level (the cutoff frequency and/or threshold) used in the twisted motion detector 60 in accordance with the upper limit rotational frequency set by the dial 74.

In the aforementioned embodiments, the motor controller 51 provides an open-loop control to the motor 30 in the control circuit 50. Nevertheless, the motor controller 51 may also be configured to provide a feedback control to the motor 30 so that the rotational frequency of the motor 30 coincides with the target rotational frequency.

The electric working machine 1 described in the aforementioned embodiments is configured as a driver drill. Nevertheless, the present disclosure can be applied to all electric power tools, such as the hammer drill 70 as mentioned above and electric grinders. In addition to these electric power tools, the present disclosure can also be similarly applied to all electric working machines such as electric grass cutters.

In other words, as seen in the aforementioned embodiments, the present disclosure can also be applied similarly to all electric working machines that are held and operated by a user with one hand and twisted in response to their output shafts being locked to thereby exert the similar effects.

Two or more functions of one element in the aforementioned embodiments may be achieved by two or more elements, and one function of one element may be achieved by two or more elements. In addition, two or more functions of two or more elements may be achieved by one element, and one function achieved by two or more elements may be achieved by one element. A part of the configurations in the aforementioned embodiments may be omitted. Furthermore, at least a part of the configurations of the aforementioned embodiments may be added to or replaced with another part of the configurations of the aforementioned embodiments.

What is claimed is:

1. An electric working machine comprising:
   an output shaft configured to be attached to a tool bit;
   a motor configured to generate a drive force to rotate the output shaft in a circumferential direction of the output shaft;
   a housing that houses the output shaft and the motor, the housing being configured to be gripped by a user of the electric working machine;
   an acceleration detector configured to detect an acceleration imposed on the housing in the circumferential direction;
   a twisted motion detector configured to detect a twisted motion of the housing based on a reference level and the acceleration detected by the acceleration detector, the reference level determining that the housing is twisted; and
   a processor configured to:
      change the reference level based on a manual operation from the user;
      receive a drive command;
      control the motor in accordance with the drive command; and
      stop or restrain drive of the motor in response to the twisted motion detector detecting the twisted motion.

2. The electric working machine according to claim 1, further comprising:
   a manual switch configured to receive the manual operation from the user,
   wherein the processor is configured to change the reference level in accordance with the manual operation received by the manual switch.

3. An electric working machine comprising:
   an output shaft configured to be attached to a tool bit;
   a motor configured to generate a drive force to rotate the output shaft in a circumferential direction of the output shaft;
   a housing that houses the output shaft and the motor, the housing being configured to be gripped by a user of the electric working machine;
   an acceleration detector configured to detect an acceleration imposed on the housing in the circumferential direction;
   a twisted motion detector configured to detect a twisted motion of the housing based on a reference level and the acceleration detected by the acceleration detector, the reference level determining that the housing is twisted;
   a manual switch configured to receive a manual operation from the user, the manual switch being further configured to define a rotating motion of the output shaft based on the manual operation received by the manual switch, the reference level being changed in accordance with the manual operation received by the manual switch; and
   a motor control circuit configured to:
      receive a drive command;
      control the motor in accordance with the drive command; and
      stop or restrain drive of the motor in response to the twisted motion detector detecting the twisted motion.

4. The electric working machine according to claim 3, further comprising:
   a transmission housed in the housing, the transmission having a first gear ratio and a second gear ratio, the transmission being configured to be switched to either the first gear ratio or the second gear ratio, the transmission being configured to transmit the drive force to the output shaft while changing a rotational speed of the motor via the first gear ratio or the second gear ratio, and the first gear ratio being higher than the second gear ratio,
   wherein the manual switch includes a gear ratio selector configured to select either the first gear ratio or the second gear ratio in accordance with the manual operation received by the manual switch, and
   the reference level is changed in response to the first gear ratio or the second gear ratio being selected by the gear ratio selector.

5. The electric working machine according to claim 3,
   wherein the manual switch includes a drive command transmitter configured to transmit the drive command in accordance with the manual operation received by the manual switch,
   the drive command varies in accordance with details of the manual operation, and
   the reference level is changed in accordance with the drive command transmitted from the drive command transmitter.

6. The electric working machine according to claim 3,
   wherein the manual switch includes an upper limit speed setter configured to set an upper limit rotational speed in accordance with the manual operation received by the manual switch,
   the motor control circuit is configured to limit a rotational speed of the motor or a rotational speed of the output shaft to the upper limit rotational speed that is set by the upper limit speed setter or less, and
   the reference level is changed in accordance with the upper limit rotational speed that is set by the upper limit speed setter.

7. The electric working machine according to claim 3,
   wherein the manual switch includes an upper limit torque setter configured to set an upper limit of an output torque generated by the output shaft in accordance with the manual operation received by the manual switch,
   the motor control circuit is configured to stop the drive of the motor in response to the output torque reaching the upper limit that is set by the upper limit torque setter, and
   the reference level is changed in accordance with the upper limit that is set by the upper limit torque setter.

8. The electric working machine according to claim 3,
   wherein the acceleration detector is configured to transmit a detection signal that indicates the acceleration detected by the acceleration detector,
   the twisted motion detector includes an electronic filter having a cutoff frequency, the electronic filter being configured to extract a detection value from the detection signal, the cutoff frequency being higher than a low frequency band and being changeable, and the detection value indicating the acceleration detected, the twisted motion detector is configured to detect the twisted motion based on the reference level and the detection value, and the cutoff frequency is changed as the reference level.

9. The electric working machine according to claim 8, wherein the cutoff frequency is lowered in accordance with a decrease in a rotational speed of the output shaft.

10. The electric working machine according to claim 3, wherein the acceleration detector is configured to transmit a detection signal that indicates the acceleration detected by the acceleration detector, the twisted motion detector is configured to perform a signal processing on the detection signal to thereby obtain a feature value of the acceleration, the twisted motion detector is configured to detect the twisted motion in response to the feature value exceeding a threshold, and the threshold is changed as the reference level.

11. The electric working machine according to claim 10, wherein the threshold is lowered in response to a rotational speed of the output shaft decreasing in accordance with the manual operation received by the manual switch.

12. The electric working machine according to claim 3, wherein the reference level is manually set by the user in association with details of the manual operation.

13. The electric working machine according to claim 3, wherein the manual switch includes a rotation direction setter configured to set a rotation direction of the motor to either a first direction or a second direction in accordance with the manual operation received by the manual switch, the motor control circuit is configured to control the motor such that the motor rotates in the rotation direction that is set by the rotation direction setter, and the reference level is changed in accordance with the rotation direction that is set by the rotation direction setter.

14. The electric working machine according to claim 13, wherein the acceleration detector is configured to transmit a detection signal that indicates the acceleration detected by the acceleration detector, the twisted motion detector includes an electronic filter having a cutoff frequency, the electronic filter being configured to extract a detection value from the detection signal, the cutoff frequency being higher than a low frequency band and being changeable, and the detection value indicating the acceleration detected, the twisted motion detector is configured to detect the twisted motion based on the reference level and the detection value, and the cutoff frequency is changed as the reference level.

15. The electric working machine according to claim 14, wherein the motor control circuit is configured to control the motor to rotate in the first direction at a first speed in response to the rotation direction being set in the first direction by the rotation direction setter, the motor control circuit is configured to control the motor to rotate in the second direction at a second speed in response to the rotation direction being set in the second direction by the rotation direction setter, the first speed is higher than the second speed, the cutoff frequency is changed to a first frequency in response to the rotation direction being set in the first direction by the rotation direction setter, the cutoff frequency is changed to a second frequency in response to the rotation direction being set in the second direction by the rotation direction setter, and the second frequency is lower than the first frequency.

16. The electric working machine according to claim 13, wherein the acceleration detector is configured to transmit a detection signal that indicates the acceleration detected by the acceleration detector, the twisted motion detector is configured to perform a signal processing on the detection signal to thereby obtain a feature value of the acceleration, the twisted motion detector is configured to detect the twisted motion in response to the feature value exceeding a threshold, and the threshold is changed as the reference level.

17. The electric working machine according to claim 16, wherein the motor control circuit is configured to control the motor to rotate in the first direction at a first speed in response to the rotation direction being set in the first direction by the rotation direction setter, the motor control circuit is configured to control the motor to rotate in the second direction at a second speed in response to the rotation direction being set in the second direction by the rotation direction setter, the first speed is higher than the second speed, the threshold is changed to a first value in response to the rotation direction being set in the first direction by the rotation direction setter, the threshold is changed to a second value in response to the rotation direction being set in the second direction by the rotation direction setter, and the second value is less than the first value.

18. The electric working machine according to claim 13, wherein the reference level is manually set by the user in association with the first direction and the second direction.

19. An electric working machine comprising:

an output shaft configured to be attached to a tool bit;

a motor configured to generate a drive force to rotate the output shaft in a circumferential direction of the output shaft;

a housing that houses the output shaft and the motor, the housing being configured to be gripped by a user of the electric working machine;

an acceleration detector configured to detect an acceleration imposed on the housing in the circumferential direction;

a twisted motion detector configured to detect a twisted motion of the housing based on a reference level and the acceleration detected by the acceleration detector, the reference level determining that the housing is twisted;

a load detector configured to detect a magnitude of a load imposed on the output shaft, the reference level being changed in accordance with the magnitude of the load detected by the load detector; and a motor control circuit configured to:
receive a drive command;
control the motor in accordance with the drive command; and
stop or restrain drive of the motor in response to the twisted motion detector detecting the twisted motion.

20. The electric working machine according to claim 19, wherein the load detector is configured to detect a physical quantity that varies in accordance with the magnitude of the load.

21. The electric working machine according to claim 20, wherein the physical quantity indicates a rotational speed of the output shaft, a rotational speed of the motor, a magnitude of a counter electromotive force generated in the motor, a magnitude of an electric current supplied to the motor, or a magnitude of an electric power supplied to the motor.

22. The electric working machine according to claim 19, wherein the acceleration detector is configured to transmit a detection signal that indicates the acceleration detected by the acceleration detector,
the twisted motion detector includes an electronic filter having a cutoff frequency, the electronic filter being configured to extract a detection value from the detection signal, the cutoff frequency being higher than a low frequency band and being changeable, and the detection value indicating the acceleration detected,
the twisted motion detector is configured to detect the twisted motion based on the reference level and the detection value, and
the cutoff frequency is changed as the reference level.

23. The electric working machine according to claim 22, wherein the cutoff frequency is lowered in accordance with an increase in the magnitude of the load detected by the load detector.

24. The electric working machine according to claim 19, wherein the acceleration detector is configured to transmit a detection signal that indicates the acceleration detected by the acceleration detector,
the twisted motion detector is configured to perform a signal processing on the detection signal to thereby obtain a feature value of the acceleration,
the twisted motion detector is configured to detect the twisted motion in response to the feature value exceeding a threshold, and
the threshold is changed as the reference level.

25. The electric working machine according to claim 24, wherein the threshold is lowered in accordance with an increase in the magnitude of the load detected by the load detector.

26. The electric working machine according to claim 20, wherein the reference level is manually set by the user in association with the physical quantity.

27. A method of detecting a twisted motion of an electric working machine, comprising:
detecting an acceleration of a housing of the electric working machine in a circumferential direction of an output shaft of the electric working machine, the output shaft being configured to be driven by a motor of the electric working machine, and the housing accommodating the output shaft and the motor therein;
detecting a twisted motion of the housing based on a reference level and the acceleration detected, the reference level determining that the housing is twisted; and
changing the reference level based on a manual operation from a user.

* * * * *